(12) United States Patent
Brochu et al.

(10) Patent No.: US 10,663,654 B2
(45) Date of Patent: May 26, 2020

(54) OPTICAL FIBER FILTER OF WIDEBAND DELETERIOUS LIGHT AND USES THEREOF

(71) Applicant: TERAXION INC., Québec (CA)

(72) Inventors: Guillaume Brochu, Québec (CA); Michel Morin, Québec (CA); François Trépanier, Québec (CA)

(73) Assignee: TERAXION INC., Québec (CA)

( * ) Notice: Subject to any disclaimer, the term of this patent is extended or adjusted under 35 U.S.C. 154(b) by 0 days.

(21) Appl. No.: 16/515,132

(22) Filed: Jul. 18, 2019

(65) Prior Publication Data

US 2019/0339446 A1    Nov. 7, 2019

Related U.S. Application Data

(63) Continuation of application No. 15/880,834, filed on Jan. 26, 2018, now Pat. No. 10,393,955.

(60) Provisional application No. 62/451,095, filed on Jan. 27, 2017.

(30) Foreign Application Priority Data

Jun. 23, 2017    (CA) .................................... 2971601

(51) Int. Cl.
   *G02B 6/02*         (2006.01)
(52) U.S. Cl.
   CPC ...... *G02B 6/02085* (2013.01); *G02B 6/02204* (2013.01)
(58) Field of Classification Search
   None
   See application file for complete search history.

(56) References Cited

U.S. PATENT DOCUMENTS

| 5,671,307 A | 9/1997 | Lauzon et al. |
| 6,005,999 A * | 12/1999 | Singh ................. G02B 6/02119 |
| | | 385/127 |
| 6,118,575 A | 9/2000 | Grubb et al. |

(Continued)

FOREIGN PATENT DOCUMENTS

| CA | 2371106 A1 | 8/2003 |
| CA | 2383807 A1 | 10/2003 |

OTHER PUBLICATIONS

Peng, X. et al., "Root cause analysis and solution to the degradation of wavelength division multiplexing (WDM) couplers in high power fiber amplifier system", Optics Express, vol. 21, No. 17, pp. 20052-20061, Aug. 2013.

(Continued)

*Primary Examiner* — Tina M Wong
(74) *Attorney, Agent, or Firm* — Bookoff McAndrews, PLLC

(57) ABSTRACT

Optical fiber filters and uses thereof are presented. In typical implementations, there is provided a FBG taking deleterious light out of a fiber core without reflecting it into the fiber core. It also allows the unhindered transmission of useful light at a wavelength outside of the spectral band covered by the deleterious light. The filter couples the incoming deleterious light to cladding modes propagating in the opposite direction without coupling the incoming useful light to core or cladding modes propagating in the opposite direction. The filter may for example be useful as a Raman or ASE filter in a laser cavity of other optical devices.

49 Claims, 16 Drawing Sheets

(56) References Cited

U.S. PATENT DOCUMENTS

| | | | |
|---|---|---|---|
| 6,141,142 A | 10/2000 | Espindola et al. | |
| 6,169,831 B1 | 1/2001 | Adams et al. | |
| 6,321,008 B1* | 11/2001 | Riant | G02B 6/0208 385/123 |
| 6,322,938 B1 | 11/2001 | Cohn | |
| 6,351,588 B1 | 2/2002 | Bhatia et al. | |
| 6,404,956 B1 | 6/2002 | Brennan, III et al. | |
| 6,427,041 B1 | 7/2002 | Strasser et al. | |
| 6,529,672 B1 | 3/2003 | Blondel et al. | |
| 6,594,423 B2* | 7/2003 | Sakamoto | G02B 6/02119 385/124 |
| 6,741,624 B2 | 5/2004 | Mears et al. | |
| 6,834,142 B2 | 12/2004 | Bailey et al. | |
| 7,035,515 B2 | 4/2006 | Riant et al. | |
| 7,095,924 B2 | 8/2006 | De Barros et al. | |
| 7,203,399 B2* | 4/2007 | Ishikawa | G02B 6/02085 385/123 |
| 7,272,287 B2 | 9/2007 | Bise et al. | |
| 7,340,136 B2 | 3/2008 | Po et al. | |
| 7,376,306 B2 | 5/2008 | Provost et al. | |
| 7,389,022 B2 | 6/2008 | De Barros et al. | |
| 7,643,715 B2 | 1/2010 | Taru et al. | |
| 7,768,700 B1 | 8/2010 | Savage-Leuchs | |
| 7,783,149 B2 | 8/2010 | Flni et al. | |
| 7,912,099 B2 | 3/2011 | Gapontsev et al. | |
| 8,035,891 B2 | 10/2011 | Goto | |
| 8,045,259 B2 | 10/2011 | Petersson et al. | |
| 8,089,689 B1 | 1/2012 | Savage-Leuchs | |
| 8,199,399 B1 | 6/2012 | Savage-Leuchs | |
| 8,345,348 B1 | 1/2013 | Savage-Leuchs | |
| 8,428,409 B2 | 4/2013 | Nicholson et al. | |
| 8,503,846 B2 | 8/2013 | Taru et al. | |
| 8,560,048 B2* | 10/2013 | Eberle | A61B 5/0097 600/407 |
| 8,705,166 B1 | 4/2014 | Savage-Leuchs | |
| 8,766,092 B2 | 7/2014 | Peng et al. | |
| 9,322,989 B2 | 4/2016 | Fini et al. | |
| 9,634,462 B2 | 4/2017 | Kliner et al. | |
| 2002/0158193 A1 | 10/2002 | Sezginer et al. | |
| 2004/0151434 A1 | 8/2004 | Galstian et al. | |
| 2004/0208451 A1 | 10/2004 | Grunnet-Jepsen et al. | |
| 2004/0223695 A1* | 11/2004 | Kersten | G02B 6/12004 385/37 |
| 2005/0078715 A1* | 4/2005 | Borne | H01S 3/0675 372/3 |
| 2005/0175284 A1 | 8/2005 | Kazuaki et al. | |
| 2006/0029111 A1 | 2/2006 | Liu | |
| 2006/0067616 A1 | 3/2006 | Kenji et al. | |
| 2010/0296080 A1 | 11/2010 | Nishikawa et al. | |
| 2011/0103743 A1 | 5/2011 | Baets et al. | |
| 2012/0201491 A1 | 8/2012 | Zhou | |
| 2013/0121639 A1 | 5/2013 | Shimizu | |
| 2014/0314374 A1 | 10/2014 | Fattal et al. | |
| 2016/0111851 A1 | 4/2016 | Kliner et al. | |
| 2017/0371090 A1 | 12/2017 | Fattal | |
| 2018/0217322 A1 | 8/2018 | Brochu et al. | |
| 2019/0339446 A1* | 11/2019 | Brochu | G02B 6/02085 |

OTHER PUBLICATIONS

Morin, M. et al., "Q-switched Fiber Lasers, Rare-Earth-Doped Fiber Lasers and Amplifiers, Second Edition—Revised and Expanded", Chapter 7, pp. 398-467, M.J.F. Digonnet ed., Marcel Dekker, 2001.

Glick, Y. et al., "Single Mode 1018nm fiber laser with power of 230W", Proc SPIE 9728, 97282T, 2015.

Agrawal, G.P., "Nonlinear Fiber Optics 3rd ed.", Academic Press, Chapter 8, pp. 298-354, 2001.

Schreiber, T. et al., "Analysis of stimulated Raman scattering in cw kW fiber oscillators", Proc. SPIE 8961, 89611T, 2014.

Nufern, "Selecting the Optimal LMA Fiber", Application Note NuAPP-2, 2014.

Fini, J.M. et al., "Distributed suppression of stimulated Raman scattering in an Yb-doped filter-fiber amplifier", Optics Letters, vol. 31, pp. 2550-2552, 2006.

Kim, J. et al., "Suppression of stimulated Raman scattering in a high power Yb-doped fiber amplifier using a W-type core with fundamental mode cut-off", Optics Express, vol. 14, pp. 5103-5113, 2006.

Jansen, F. et al., "Modeling the inhibition of stimulated Raman scattering in passive and active fibers by lumped spectral filters in high power fiber laser systems", Optics Express, vol. 17, pp. 16255-16265, 2009.

Nodop, D. et al., "Suppression of stimulated Raman scattering employing long period gratings in double-clad fiber amplifiers", Optics Letters, vol. 35, pp. 2982-2984, 2010.

Kashyap, R. et al., "Wideband gain flattened erbium fibre amplifier using a photosensitive fibre blazed grating", Electronic Letters, vol. 29, pp. 154-156, 1993.

Kashyap, R., "Fiber Bragg Gratings, Academic. Press", 2nd edition, Chapter 1 (pp. 1-13) and Chapter 8 (pp. 347-404), 2010.

Othonos, A. et al., "Fiber Bragg Gratings. Fundamentals and Applications in Telecommunications and Sensing", Artech House, pp. 223-396, 1999.

Kim, J.M. et al., "Suppression of cladding-mode coupling loss in fiber Bragg gratings by independent control of refractive index and photosensitive profiles in a single-mode optical fiber", IEEE Photonics Technology Letters, vol. 12, pp. 1504-1506, 2000.

Durkin, M., Ibsen, M., Laming, R.I. and Gusmeroli, V. (1997) Equalisation of spectral non-uniformities in broad-band chirped fibre gratings. At Bragg Gratings, Photosensitivity and Poling in Glass Waveguides (BGPP) Bragg Gratings, Photosensitivity and Poling in Glass Waveguides (BGPP), pp. 1-4, Oct. 1997 (available at https://eprints.soton.ac.uk/76741/).

Wetter, A. et al., "High power cladding light strippers", Proc. SPIE 6873, 687327 (8 pages), 2008.

* cited by examiner

Grating covering only a portion of the core

OPTICAL FIBER FILTER OF WIDEBAND DELETERIOUS LIGHT AND USES THEREOF

CROSS-REFERENCE TO RELATED APPLICATIONS

This patent application is a continuation of U.S. application Ser. No. 15/880,834, filed on Jan. 26, 2018, which claims the benefit under 35 U.S.C. § 119 to U.S. Provisional Patent Application No. 62/451,095, filed on Jan. 27, 2017, and to Canadian Patent Application No. 2,971,601, filed on Jun. 23, 2017, the entireties of which are incorporated herein by reference.

TECHNICAL FIELD

The technical field generally relates to optical fiber devices.

BACKGROUND

The optical fiber has found widespread use because of its extraordinary ability to guide light over considerable distances with little attenuation. This ability is typically maintained over a sizable spectral range, a feature which in some applications becomes troublesome by allowing guidance of deleterious light.

A first example of such an application is the generation of short pulses of light with Q-switched fiber lasers. As known in the art, amplified spontaneous emission (ASE) constitutes an important limiting factor in such lasers [M. Morin et al., *Q-switched Fiber Lasers*, Chapter 7 in *Rare-Earth-Doped Fiber Lasers and Amplifiers, Second Edition, Revised and Expanded*, M. J. F. Digonnet ed., Marcel Dekker, 341-394 (2001)]. The operation of a Q-switched laser involves a pumping stage during which laser oscillation is impeded by strong intra-cavity optical losses. The objective of the pumping stage is to store as much energy as possible within the gain medium, thus realizing as well the highest possible gain. The intra-cavity losses are then turned off suddenly, either by external means (active Q-switching) or by the optical power itself (passive Q-switching). The high gain coupled to the low cavity losses ensures a very rapid build-up of the laser oscillation leading to the formation of a short and energetic optical pulse. The ASE taking place during the pumping stage can lead to a sizable depletion of the energy stored in the gain medium, thus lowering the available energy and the gain at the time the intra-cavity losses are turned off. This leads to weaker and longer pulses. Wideband intra-cavity attenuation of the ASE is therefore desirable to keep it from reaching appreciable levels.

Amplified spontaneous emission can be troublesome in cw (continuous wave) fiber lasers as well [Y. Glick et al., *Single Mode* 1018 *nm fiber laser with power of* 230W, Proc. SPIE 9728, 97282T (2015)]. From a thermal management point of view, it is preferable to run a high-power fiber laser at the shortest wavelength afforded by the gain medium. This reduces the Stokes defect between pump and laser photons, i.e. the difference between the energy of each pump photon absorbed to excite the gain medium and that of each photon emitted by the laser. Globally, running the laser at a shorter wavelength reduces the difference between the pump power absorbed by the gain medium and the optical power emitted by the laser. This difference comes out as heat that must be dissipated somehow. Operation at a short wavelength is difficult when the available gain at longer wavelengths is stronger. Narrow band reflectors, that provide feedback at the shorter wavelengths but not at longer wavelengths, can be used to avoid lasing at the longer wavelengths. Even in this case, the stronger gain at longer wavelengths can lead to a powerful emission of ASE and a sizable reduction of the laser emission at the shorter wavelength. Such lasers can thus benefit from the intra-cavity wideband filtering of ASE as well.

The optical fiber, by allowing the propagation of intense light over long distances, is an ideal medium for observing nonlinear effects. One of these effects is Raman scattering, resulting from the interaction between an intense optical field and the glass molecules constituting the fiber [G. P. Agrawal, *Nonlinear Fiber Optics* $2^{nd}$ ed., Academic Press, Chapter 8, 316-369 (1995)]. Raman scattering manifests itself as a transfer of power from an incoming optical wavelength to a longer wavelength, the spectral shift being characteristic of the material where it occurs. In fused silica, the Raman gain extends over tens of nanometers and is maximum at a wavelength shift of 46 nm when the incident light has a wavelength of 1000 nm. Raman scattering can be a serious impediment in various applications. It limits the reach of optical fiber communication links that can be achieved by increasing the optical power of the signal launched in the fiber. When the optical power reaches a threshold value (see e.g. G. P. Agrawal, *Nonlinear Fiber Optics* $2^{nd}$ ed. supra, section 8.1.2), Raman scattering sets in and leads to a sizable transfer of power to longer wavelengths [J.-P. Blondel et al., Elimination of optical power limitation due to stimulated Raman scattering in fiber optic links, U.S. Pat. No. 6,529,672]. This is clearly problematic in optical communications links where each channel is carried by a given wavelength. Raman scattering is significant when watt-level optical powers propagate over kilometers of single mode fiber. In fiber laser systems operating at kilowatt-level optical powers, Raman scattering sets in over commensurably shorter fibers. It contributes to a detrimental spectral widening of the laser output beam [T. Schreiber et al., *Analysis of stimulated Raman scattering in cw kW fiber oscillators*, Proc. SPIE 8961, 89611T (2014)]. The main application of high power fiber lasers is material processing. A high-power fiber laser and the optical link carrying the laser output are designed to get the laser output to a target with minimum losses. One motivation is to maximize the efficiency of the material processing. Another is reliability and security, ensuring that the high optical power does not go where it should not. Light generated by Raman scattering, being at a sizably different wavelength than that generated by the laser gain medium, can interact differently than designed for with mirrors, filters, optical coatings and optics, reducing efficiency and raising reliability and security concerns. Raman scattering can take place in the fiber laser itself but also in optical fiber links coupled to the laser. Given the high optical powers involved, the light generated by Raman scattering can become quite powerful. Back reflection of this powerful Raman light in the fiber laser can destabilize its operation and even lead to optical damage [V. P. Gapontsev et al., Method and apparatus for preventing distortion of powerful fiber-laser systems by backreflected signals, U.S. Pat. No. 7,912,099]. Raman scattering is a major impediment limiting the achievable power in fiber laser systems.

Diverse types of fibers have been proposed to either thwart the generation of wideband deleterious light or attenuate preferentially wideband deleterious light. By way of example, in the case of Raman scattering and other nonlinear effects, one approach is to increase the transversal extent over which light is carried by an optical fiber, thus reducing the optical intensity (W/cm$^2$) for a given optical power (W). A vast body of technical literature is devoted to large mode area (LMA) fibers, i.e. fibers with a transversal structure that supports a larger fundamental core mode (see e.g. [J. M. Fini, Large-mode-area optical fibers with reduced bend distortion, U.S. Pat. No. 7,783,149] and references found therein). However, there is a practical limit to this approach as the sensitivity of a fiber to bending typically increases with the fundamental mode effective area. Still larger core fibers can be used that support multiple core modes, but at the expense of a reduction in the optical quality of light carried by the fiber, which is then more difficult to focus to a tight spot. Coiling slightly multimode fibers can be used to attenuate preferentially higher order modes [*Selecting the Optimal LMA Fiber*, Application Note NuAPP-2, Nufern]. Various optical fibers have also been proposed that provide preferential attenuation over specific wavelength bands (see e.g. S. G. Grubb et al., Optical fiber gain medium with evanescent filtering, U.S. Pat. No. 6,118, 575; R. T. Bise et al., Optical fiber for suppression of amplified spontaneous emission, U.S. Pat. No. 7,272,287; T. Tam and J. C. Knight, Optical power delivery system, U.S. Pat. No. 7,643,715; R. Goto, Photonic bandgap fiber, U.S. Pat. No. 8,035,891; A. Petersson et al., Active optical fibers with wavelength-selective filtering mechanism, method of production and their use, U.S. Pat. No. 8,045,259; T. Tam et al., All solid photonic bandgap fiber, U.S. Pat. No. 8,503, 846; J. M. Fini et al., *Distributed suppression of stimulated Raman scattering in an Yb-doped filter-fiber amplifier*, Optics Letters 31, 2550-2552 (2006); and J. Kim et al., *Suppression of stimulated Raman scattering in a high power Yb-doped fiber amplifier using a W-type core with fundamental mode cut-off*, Optics Express 14, 5103-5113 (2006), and references therein). Some of these fibers must be bent or coiled to perform as desired (see e.g. J. W. Nicholson et al., Filter fiber for use in Raman lasing applications and techniques for manufacturing same, U.S. Pat. No. 8,428,409; and J. M. Fini and J. W. Nicholson, Optical fiber with distributed bend compensated filtering, U.S. Pat. No. 9,322, 989). The concatenation of fibers with different core sizes, including tapered and bent fiber segments, has also been proposed to provide filtering of deleterious light (M. P. Savage-Leuchs, Method and apparatus for optical gain fiber having segments of differing core sizes, U.S. Pat. No. 7,768,700; M. P. Savage-Leuchs, Apparatus and method for optical gain fiber having segments of differing core sizes, U.S. Pat. No. 8,089,689; M. P. Savage-Leuchs, Optical gain fiber having segments of differing core sizes and associated method, U.S. Pat. No. 8,199,399; M. P. Savage-Leuchs, Method and optical gain fiber having segments of differing core size, U.S. Pat. No. 8,345,348; and M. P. Savage-Leuchs, Optical gain fiber having tapered segments of differing core sizes and associated method, U.S. Pat. No. 8,705,166). Self-imaging in a multimode interference filter (MMI) can be used to filter out an undesirable wavelength [V. P. Gapontsev et al., U.S. Pat. No. 7,912,099, supra]. To this end, a segment of multimode fiber is inserted between two single mode fibers. Properly adjusting the length of the multimode fiber segment ensures that a useful wavelength is transmitted with little loss while other wavelengths get attenuated.

Other than performance limitations (see e.g. J. Kim et al., Optics Express 14, (2006), supra; F. Jansen et al., *Modeling the inhibition of stimulated Raman scattering in passive and active fibers by lumped spectral filters in high power fiber laser systems*, Optics Express 17, 16255-16265 (2009); and D. Nodop et al., *Suppression of stimulated Raman scattering employing long period gratings in double-clad fiber amplifiers*, Optics Letters 35, 2982-2984 (2010) for a discussion), a disadvantage of these approaches is their reliance on specific fiber designs. Their implementation requires the insertion of one or multiple segments of fiber within a system. A fiber that is optimal for filtering may not be optimal for other aspects of a system operation. Moreover, these approaches afford little flexibility as the potential performance is predetermined by the fiber design.

Referring to FIG. 3 (PRIOR ART) it is also known to use a uniform period FBG coupled to a circulator to separate useful light from wideband deleterious light. Light enters the circulator through a first port. It then reaches the second port of the circulator where the FBG is connected. Deleterious light at wavelengths outside of the reflectivity spectrum of the FBG is transmitted and leaves the circulator through the second port. Deleterious light at shorter wavelengths than the useful light can also be reflected into cladding modes (not indicated in the figure). Useful light is reflected by the FBG into the fiber core and towards the third port of the circulator. This approach requires a supplementary optical component (the circulator). Transmission through the circulator and a less than 100% reflectivity of the FBG can both induce losses to the useful light. Furthermore, this approach is not well adapted to situations involving high peak powers or high average powers because of the risk of damage to the circulator, either optical or thermal.

FBGs having a chirped period (CFBGs), slanted fringes (SFBGs) or both (CSFBGs) are known in the art of light filtering. Gain flattening in optical fiber communications link has been a major application of CSFBGs, the optical loss of a CSFBG combining with the gain of an amplifier to provide an effective amplification that is uniform over a spectral band of interest [I. Riant and P. Sansonetti, Filter optical waveguide with inclination and linear chirp, U.S. Pat. No. 6,321,008]. CSFBGs have also been used to attenuate light over the spectral band 1520-1565 nm in order to favor amplification over the spectral band 1565-1625 nm in L-band Er-doped fiber amplifiers [R. P. Espindola et al., Article comprising an L-band optical fiber amplifier, U.S. Pat. No. 6,141,142]. The suppression of Raman scattering in optical fibers with lumped filters is discussed in J.-P. Blondel et al., U.S. Pat. No. 6,529,672 (supra) and F. Jansen et al., Optics Express 17, (2009) (supra), both references addressing the optimal positioning of multiple filters along an optical fiber to impede the growth of Raman scattering. Blondel et al stresses the importance of filtering both forward and backward propagating Raman light and the importance of avoiding reflection of light in the fiber core by the lumped filters. Jansen et al proposed using long period gratings (LPG) for filtering. This was followed by an experimental demonstration of the suppression of Raman scattering in a fiber amplifier using LPGs as filters [D. Nodop et al., Optics Letters 35, (2010), (supra)]. Filtering in a LPG and in a SFBG results from coupling light from the core and into the cladding, the difference being that a LPG transmits light into the cladding whereas a SFBG reflects light into it. In both cases, light coupled into the cladding is eventually lost. Gapontsev et al. (supra) discloses the use of SFBGs in a high-power MOPA system to avoid a powerful and potentially destructive reflection of Raman light into a fiber laser oscillator. D. A. V. Kliner and T. S. McComb, Slanted FBG for SRS suppression, US patent application 20160111851 discloses the suppression of Raman scattering with a SFBG that is explicitly chirped.

The suppression of deleterious light inside a laser cavity has been considered as well. J. Liu (Hybrid high power laser to achieve high repetition rate and high pulse energy, US patent application 20060029111) discloses the insertion of FBGs inside a laser cavity, without specifying further the nature of the gratings, to reduce ASE and Raman scattering. H. Po and A. A. Demidov, Multi-wavelength optical fiber, U.S. Pat. No. 7,340,136 discloses the use of LPGs and SFBGs in a Raman laser to suppress the generation of a given Stokes order. In a Raman laser, a cascade of cavities is used to generate light of ever greater wavelength. A first cavity is built to resonate at the wavelength of a pump light. The ensuing high intensity of the pump light leads to the generation of light at a longer wavelength through Raman scattering. This light at a longer wavelength, called the first Stokes order, is used to pump a second cavity designed to resonate at the longer wavelength. The ensuing high intensity at the longer wavelength favors the generation of light at a still longer wavelength through Raman scattering, called the second Stokes order, and so on. H. Po et al. (supra) discloses the insertion of a LPG or SFBG in a cavity to suppress Raman scattering past a desired maximum Stokes order. Even though the origin of the gain sustaining oscillation is different than in a standard laser, the general idea is the same, i.e. the introduction of a filter inside a cavity to impede the generation of undesirable light. Kliner et al. (supra) discloses the insertion of a CSFBG inside a laser cavity to suppress Raman scattering.

To prevent the reflection of light into counter-propagating core modes, SFBG with a pronounced tilt angle of the grating fringes are preferably used [R. Kashyap et al., *Wideband gain flattened erbium fibre amplifier using a photosensitive fibre blazed grating*, Electronics Letters 29, 154-156 (1993)]. However, as discussed in Riant et al. (supra), a larger tilt angle makes it more difficult to precisely define the spectral response of a CSFBG. The realization of SFBGs producing little reflection in the fiber core has received quite a bit of attention (see e.g. T. A. Strasser and P. S. Westbrook, Article comprising a tilted grating in a single mode waveguide, U.S. Pat. No. 6,427,041; and references found therein). The reduction in reflectivity is achieved by using optical fibers with specially tailored refractive index and photosensitivity profiles (I. Riant et al. (supra); A. Strasser et al., (supra); I. Riant and C. De Barros, Optical waveguide and method for creating an asymmetrical optical filter device, U.S. Pat. No. 7,035,515; S. Ishikawa et al., Optical fiber and fiber grating type filter including the same, U.S. Pat. No. 7,203,399; C. De Barros et al., Photosensitive optical waveguide, U.S. Pat. No. 7,389,022). These profiles are designed to minimize the scattering efficiency between the counter-propagating fundamental core modes. Another approach is to perform the mode coupling in a slightly multimode fiber with a SFBG designed to couple the fundamental core mode with a higher order core mode [C. De Barros et al., Optical filter, U.S. Pat. No. 7,095,924]. The slightly multimode fiber is inserted between two single mode optical fibers that do not support the higher order core mode. A disadvantage of these approaches is again their reliance on specific optical fibers.

There remains a need for efficient filtering of deleterious light in optical fiber devices while alleviating at least some of the drawbacks of the prior art.

SUMMARY

The present description is concerned with the wideband filtering of deleterious light propagating in an optical fiber, this filtering being realized without producing any significant reflection of light within the fiber core.

The present description generally concerns a filter inscribed within an optical fiber. In typical implementations, this filter takes deleterious light covering a wide spectral band out of the fiber core without reflecting it into the fiber core. It also allows the unhindered transmission of useful light at a wavelength outside of the spectral band covered by the deleterious light. More specifically, incoming deleterious light is carried by core modes of the fiber. The filter couples the incoming deleterious light to cladding modes propagating in the opposite direction without coupling the incoming deleterious light to core modes propagating in the opposite direction. Likewise, incoming useful light is carried by core modes. The filter transmits the useful light without coupling it to either core modes or cladding modes propagating in the opposite direction. These are ideal characteristics that the present filter, when properly designed, can fulfill closely. Such a filter is suitable for use inside a laser cavity or in situations where minute reflections are problematic, as in the presence of high gain Raman scattering or the like.

In accordance with one aspect, there is provided a Raman filter for filtering a light beam having a useful component and a Raman component. The Raman filter includes an optical fiber path having a core and at least one cladding surrounding the core. At least one Fiber Bragg Grating (FBG) having an input end and an output end is disposed along the optical fiber path to receive the light beam along a core mode at the input end. The FBG includes a refractive index modulation in the core of the optical fiber path. The refractive index modulation defines slanted grating fringes having a tilt angle and a longitudinal variation defining a chirped grating period which is maximum at the input end and decreases progressively from the input end to the output end. The grating period further has a variation defining a Bragg wavelength longer than a wavelength of the useful component at all points along the FBG.

In some implementations, the tilt angle of the grating fringes is between about 1.5 and 15 degrees, or between 2.6 and 5.2 degrees. The tilt angle of the grating fringes may vary along the FBG.

In some implementations, the refractive index modulation defines grating fringes covering a portion only of the core. These grating fringes may be normal to a longitudinal axis of said core.

In some implementations, the variation of the grating period and the tilt angle of the grating fringes are designed such that a shorter wavelength providing coupling to cladding modes is longer than the wavelength of the useful component at all points along the FBG.

The core of the optical fiber path may be multimode.

The grating period may be linearly chirped or nonlinearly chirped.

In some implementations, the refractive index modulation has an apodized amplitude.

In some implementations, the Raman filter includes two FBGs disposed output end-to-output end along the optical fiber path. The optical fiber path hosting the two FBGs may be a single segment of optical fiber, or two segments of optical fiber optically coupled together, each of the two segments of optical fiber hosting one of said two FBGs. In some variants, the chirped grating period of the respective grating fringes of the two FBGs have a same longitudinal variation.

In some implementations, the Raman filter may further include an active tuning mechanism coupled to the FBG.

In accordance with another aspect, there is provided an optical fiber path for transporting a light beam generating Raman scattered light.

The optical fiber path includes a core carrying the light beam, at least one cladding surrounding the core, and a Fiber Bragg Grating (FBG) having an input end and an output end and disposed along the optical fiber path to receive the light beam along a core mode at the input end.

The FBG includes a refractive index modulation in the core of the optical fiber path having a profile designed to allow the light beam to propagate to the output end while coupling the Raman scattered light into one or more counter-propagating cladding mode. The refractive index modulation has a period maximum at the input end and decreasing progressively from the input end to the output end.

The period of the reflective index modulation may be linearly chirped or nonlinearly chirped.

In some implementations, the refractive index modulation defines slanted grating fringes having a tilt angle. The tilt angle of the grating fringes may be between about 1.5 and 15 degrees, or between 2.6 and 5.2 degrees. The tilt angle of the grating fringes may vary along the FBG.

In some implementations, the refractive index modulation defines grating fringes covering a portion only of the core. These grating fringes may be normal to a longitudinal axis of said core.

In some implementations, the refractive index modulation may have an apodized amplitude.

In accordance with another aspect, there is provided an optical device supporting a light beam having a useful component and a deleterious component. The optical device includes an optical fiber path having a core and at least one cladding, and configured to guide the light beam in a core mode along a propagation direction. The optical device further includes a Fiber Bragg Grating (FBG) disposed along the optical fiber path and having an input end and an output end with respect to the propagation direction. The FBG includes a refractive index modulation in the core of the optical fiber path having a chirped period larger at the input end than at the output end. The refractive index modulation is configured to allow the useful component of the light beam through the FBG and to couple the deleterious component of the light beam into one or more counter propagating cladding mode of the optical fiber path.

In some implementations, the refractive index modulation defines slanted grating fringes having a tilt angle. The tilt angle of the grating fringes may be between about 1.5 and 15 degrees, or between 2.6 and 5.2 degrees. The tilt angle of the grating fringes may vary along the FBG.

In some implementations, the refractive index modulation defines grating fringes covering a portion only of the core. These grating fringes may be normal to a longitudinal axis of said core.

In some implementations, the core of the optical fiber path is multimode.

The period of the refractive index modulation may be linearly or nonlinearly chirped.

In some implementations, the refractive index modulation has an apodized amplitude.

In some implementations, an active tuning mechanism may be coupled to the FBG.

In some implementations, the optical device is a laser including a laser cavity. The FBG may be positioned inside or outside of the laser cavity.

In some implementations, the deleterious component may be one of Amplified Spontaneous Emission and Raman scattering.

In accordance with another aspect, there is provided a method of filtering a Raman component out of a light beam having a useful component and said Raman component. The method includes the steps of:
designing a modulation index profile defining a Bragg Grating having an input end and an output end, the refractive index modulation including slanted grating fringes having a tilt angle and a longitudinal variation defining a chirped grating period which is maximum at the input end and decreases progressively from the input end to the output end. The grating period has a variation defining a Bragg wavelength longer than a wavelength of the useful component at all points along the FBG;
photoinducing the modulation index profile in a core of an optical fiber path, the modulation index profile being positioned along the optical fiber path so as to receive the light beam along a core mode at the input end; and
propagating the light beam along the optical fiber path.

In some implementations, the tilt angle of the grating fringes is between about 1.5 and 15 degrees. In some implementations, the tilt angle of the grating fringes is between 2.6 and 5.2 degrees.

In some implementations, the designing of the refractive index modulation profile includes varying the grating period and the tilt angle of the grating fringes such that a shorter wavelength that gets coupled to cladding modes in the optical fiber path is longer than the wavelength of the useful component at all points along the FBG.

The grating period may be linearly or nonlinearly chirped.

In some implementations, the refractive index modulation profile has an apodized amplitude.

In accordance with another aspect, there is provided a bidirectional filter for filtering a light beam having a useful component and a deleterious component.

The bidirectional filter includes a pair of Fiber Bragg gratings (FBG). Each FBG includes an optical fiber path having a core and at least one cladding surrounding this core, and a refractive index modulation in the core of the optical fiber path and having a chirped period.

The FBGs of the pair are disposed end-to-end with the period of the corresponding refractive index modulation decreasing progressively towards the other one of the FBGs. The refractive index modulation of each FBG is configured to allow propagation of the useful component of the light beam through the FBG in a core mode and to couple the deleterious component of the light beam into one or more counter propagating cladding mode of the optical fiber path.

In some implementations, the refractive index modulation of each FBG defines slanted grating fringes having a tilt angle. The tilt angle of the grating fringes may be between about 1.5 and 15 degrees, or between 2.6 and 5.2 degrees. The refractive index modulation may also define grating fringes covering a portion only of the core.

The core of the optical fiber path of each FBG may be multimode.

The period of the refractive index modulation of each FBG may be linearly or nonlinearly chirped.

In some implementations, the refractive index modulation of each FBG has an apodized amplitude.

The deleterious component may for example be one of Amplified Spontaneous Emission and Raman scattering.

In some implementations, the bidirectional filter further includes an active tuning mechanism coupled to at least one of the FBGs.

The refractive index modulations in the FBGs of the pair may have a same profile or different profiles.

In accordance with another implementation, there is also provided a bidirectional filter for filtering a light beam having a useful component and a deleterious component. The bidirectional filter includes an optical fiber path having a core and at least one cladding surrounding the core. A Fiber Bragg grating (FBG) having a refractive index modulation is provided along the core of the optical fiber path and has a period varying along the FBG. This period is maximum at opposite ends of the FBG and decreases progressively towards a midpoint thereof. The refractive index modulation of the FBG is configured to allow propagation of the useful component of the light beam through the FBG in a core mode and to couple the deleterious component of the light beam into one or more counter propagating cladding mode of the optical fiber path.

In some implementations, the refractive index modulation defines slanted grating fringes having a tilt angle. The tilt angle of the grating fringes may be between about 1.5 and 15 degrees, or between 2.6 and 5.2 degrees. In some other implementations the refractive index modulation defines grating fringes covering a portion only of the core.

The core of the optical fiber path may be multimode.

The period of the refractive index modulation may be nonlinearly chirped, or may be linearly chirped between the midpoint of the FBG and the respective output ends. In some variants, the refractive index modulation may have an apodized amplitude.

In some implementations, the deleterious component is one of Amplified Spontaneous Emission and Raman scattering.

In some implementations, the bidirectional filter may further include an active tuning mechanism coupled to the FBG.

In accordance with another aspect, there is provided a fiber laser cavity.

The fiber laser cavity includes an optical fiber path having a core and at least one cladding surrounding the core, the optical fiber path having opposite extremities A pair of cavity mirrors are disposed on either extremity of the optical fiber path.

The fiber laser cavity further includes a Raman filter or an ASE filter disposed in the optical fiber path in close proximity to one of the cavity mirrors. The Raman filter or the ASE filter includes a Fiber Bragg Grating (FBG) having an input end and an output end and disposed along the optical fiber path with the output end on a side of the proximate one of the cavity mirrors. The FBG has a refractive index modulation in the core of the optical fiber path having a profile designed to allow a useful laser beam to propagate to the output end while coupling Raman scattered light or ASE into one or more counter-propagating cladding mode. The refractive index modulation has a period maximum at the input end and decreasing progressively from the input end to the output end.

In some implementations, the refractive index modulation defines slanted grating fringes having a tilt angle, which may be between about 1.5 and 15 degrees, or between 2.6 and 5.2 degrees. The tilt angle of the grating fringes may vary along the FBG.

In some implementations, the variation of the period of the refractive index modulation and the tilt angle of the grating fringes are designed such that a shorter wavelength that gets coupled to cladding modes is longer than the wavelength of the useful component at all points along the FBG.

The period of the refractive index modulation may be linearly or nonlinearly chirped.

In some implementations, the refractive index modulation has an apodized amplitude.

In accordance with another aspect, there is provided a fiber laser cavity including an optical fiber path having a core and at least one cladding surrounding the core, the optical fiber path having opposite extremities.

The fiber laser cavity also includes a pair of cavity mirrors disposed on either extremity of the optical fiber path.

The fiber laser cavity further includes a Raman filter or an ASE filter disposed in the optical fiber path between the cavity mirrors. The Raman filter or ASE filter includes a Fiber Bragg grating (FBG) having a refractive index modulation along the core of the optical fiber path and having a period varying along this FBG. The period is maximum at opposite ends of the FBG and decreasing progressively towards a midpoint thereof. The refractive index modulation is configured to allow propagation of a useful laser beam through the FBG in a core mode and to couple Raman scattered light or ASE into one or more counter propagating cladding mode of the optical fiber path.

In some implementations, the refractive index modulation defines slanted grating fringes having a tilt angle. The tilt angle of the grating fringes may be between about 1.5 and 15 degrees, or between 2.6 and 5.2 degrees. The tilt angle of the grating fringes may vary along the FBG.

In some implementations, the variation of the period of the refractive index modulation and the tilt angle of the grating fringes are designed such that a shorter wavelength providing coupling to cladding modes is longer than the wavelength of the useful component at all points along the FBG.

The period of the refractive index modulation may be linearly or nonlinearly chirped.

In some implementations, the refractive index modulation may have an apodized amplitude.

In accordance with yet another aspect, there is provided an optical device supporting a light beam. The optical device includes an optical fiber path having a core and at least one cladding, and configured to guide the light beam in a core mode along a propagation direction. The optical device further includes a first and a second Fiber Bragg Grating (FBG) successively disposed along the optical fiber path and each having an input end and an output end with respect to said propagation direction, each of said FBG comprising a refractive index modulation in the core of the optical fiber path having a chirped period larger at the input end than at the output end. The refractive index modulation is configured to allow a useful component of the light beam through the FBG. The refractive index of modulation of the first and second FBGs are further configured to couple a first and a second deleterious component of the light beam into one or more counter propagating cladding mode of the optical fiber path, respectively, the first and the second deleterious components covering different spectral ranges.

Embodiments of the filters and optical devices described herein may circumvent the disadvantages of the prior art as they rely on a grating written in an optical fiber. Current design and fabrication techniques provide much flexibility in tailoring the spectral response of a fiber Bragg grating (FBG). Furthermore, FBGs can be fabricated by submitting an optical fiber to an interference fringe pattern of UV radiation as long as the fiber is photosensitive. Most optical fibers are photosensitive at least in the core, where germanium is present to increase the index of refraction. If needed, various sensitization techniques are available to increase the photosensitivity of the fiber to UV radiation. Moreover, a femtosecond laser in the near infrared can be used to produce a grating in a fiber that is not photosensitive. The present optical filter can thus be produced in a fiber already used in a system or in less exotic fibers than those proposed for filtering.

In several fields of application, in-fiber filter of wideband deleterious light such as described herein may be highly useful. Such a filter preferably attenuates deleterious light as strongly as possible. The attenuation spectrum of the filter preferably covers the spectrum of the deleterious light. Moreover, the attenuation of deleterious light preferably results from the deleterious light being taken out of the fiber core rather than reflected within the fiber core, since its harmful effect usually does not depend on its direction of propagation. For example, ASE propagating in both directions can deplete the gain inside of a fiber laser. Likewise, Raman light propagating in either direction can grow at the expense of a useful light signal. The requirement of no reflection within the fiber core may be more critical when a high gain is available for amplification of the deleterious light. In this case, minute reflections can provide sufficient feedback to allow parasitic oscillations. A high Raman gain results when the optical intensity, i.e. the power per unit area, is high and when propagation takes place over sizable distances. These conditions are easily met in an optical fiber because of the small transversal extent of the core modes and the low fiber attenuation allowing propagation over long distances. The Raman gain can be so high that Rayleigh backscattering in the fiber suffices to induce oscillations. Under such conditions, the wideband filtering of deleterious light is preferably performed while minimizing its reflection in the fiber core.

In some implementations, the filter advantageously has as little impact as possible on useful light propagating in the fiber. Attenuation of useful light by coupling to cladding modes is preferably minimized or avoided. Reflection of useful light within the fiber core is preferably minimized or avoided as well. In applications where light propagating in the fiber is on its way towards a point of use, a reflection into the fiber core or cladding may represent a detrimental loss.

The lack of reflection of useful light in the fiber core may be of particular usefulness when the filtering takes place inside a fiber laser cavity. When an optical component is inserted inside a laser cavity, care must be exercised to avoid that parasitic reflections on this component get coupled to the laser modes. Whenever this happens, coupled cavities are created that renders the laser behaviour susceptible to interferential perturbations. An unstable output ensues. In a bulk laser, the proper alignment of an inserted optical component can ensure that reflections on the component exit the laser cavity without coupling to laser modes. In a fiber laser, the filter should minimize the reflection of light in the fiber core, since modes guided by the fiber core are generally those participating in the oscillation of a fiber laser.

Other features and advantages of the invention will be better understood upon a reading of embodiments thereof with reference to the appended drawings.

DETAILED DESCRIPTION

Figure 1:
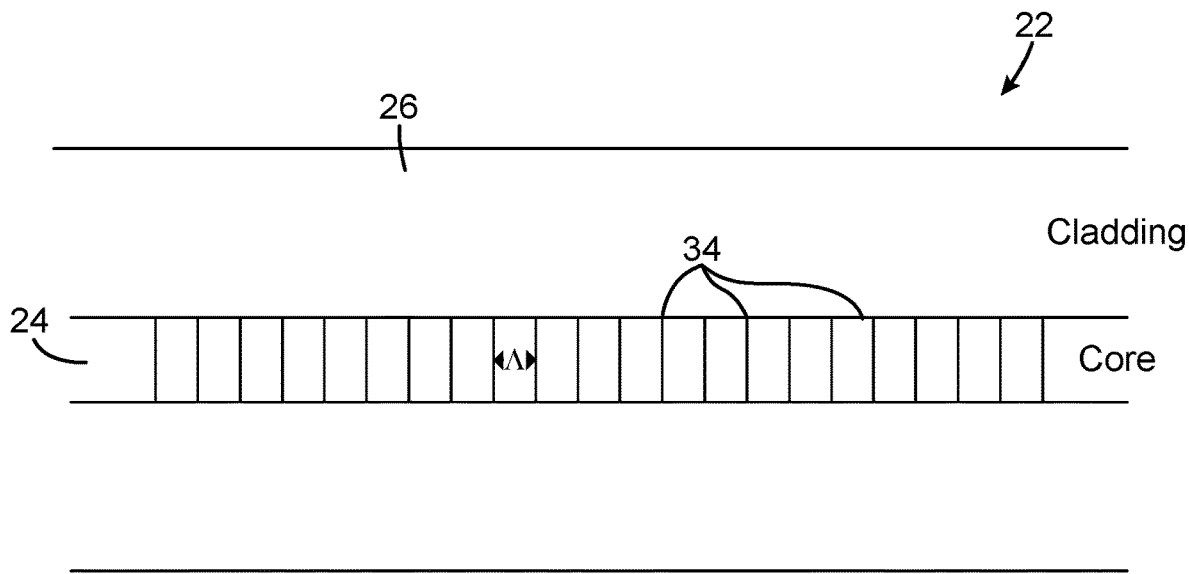
FIG. 1 is a schematised representation of a FBG provided in an optical fiber path.

The present description is concerned with optical devices and optical filters providing the wideband filtering of deleterious light propagating in an optical fiber.

Implementations of the filters described above may be used in a variety of contexts. The optical device may be embodied by any one of several devices which includes one or more optical fibers which support the propagation of a light beam having a useful component and a deleterious component. As one skilled in the art will readily understand, the expression "useful light component" is meant to encompass any light generated and/or guided in the optical fiber which is intended for use, and/or which is to propagate within the optical fiber unhindered. The expression "deleterious light component" is meant to refer to light having properties which may damage the optical device or other elements in a path of the light or more generally to light which one wishes to remove from the optical device.

It will be further understood that the expression "light component" is meant to refer to a portion of a light beam at a particular wavelength, within a particular spectral range or having a particular spectral profile. The useful and deleterious light components can therefore be understood as groups of photons of different wavelengths within a same light beam.

The optical devices incorporating filters such as described herein may be useful in fiber lasers and fiber laser systems where ASE or Raman scattering is problematic. The filter can be used inside the fiber laser itself or outside, for example in amplification stages or in a delivery fiber. In one implementation, the filter may be used downstream the laser cavity of a Master Oscillator Power Amplifier (MOPA), for example in an amplification stage. In applications requiring the transport of a sizable optical power over long optical fibers, a periodical distribution of filters along the fiber can avoid reaching the threshold level at which Raman scattering becomes sizable. It will be further understood that the contexts listed herein are provided by way of example only and the embodiments of the invention described herein may be useful in other applications.

In some implementations, the optical device includes an optical fiber path (or optical fiber) which includes a core and a cladding. In some embodiments, the optical fiber may be a multi-clad fiber, that is, have a plurality of claddings. The optical fiber is configured to guide the light beam in a core mode along a propagation direction. The concepts of modes and propagation directions are elaborated on further below. In some implementations, the optical fiber may be a Polarization Maintaining (PM) fiber.

The optical device further includes a Fiber Bragg Grating (FBG) disposed along the optical fiber path. The FBG is also referred to as a filter or optical filter or deleterious light filter in the present description. The FBG has an input end and an output end with respect to the propagation direction of the light beam in the core of the optical fiber. The FBG is or includes a refractive index modulation in the core of the optical fiber path defining slanted grating fringes with a chirped period. As will be explained further below, the period of the refractive index modulation is advantageously larger at the input end than at the output end of the FBG. Furthermore, the refractive index modulation is designed to allow the useful component of the light beam through the FBG and to couple the deleterious component of the light beam into counter propagating cladding modes of the optical fiber path. In other words, the filtering of the deleterious component of the light beam out of the optical fiber is realized without significantly affecting the useful light component.

In typical implementations, the filter takes deleterious light covering a wide spectral band out of the fiber core without reflecting this light into the fiber core. It also allows the unhindered transmission of useful light at a wavelength outside of the spectral band covered by the deleterious light. More specifically, incoming deleterious light is carried by core modes of the fiber. The filter couples the incoming deleterious light to cladding modes propagating in the opposite direction without coupling the incoming deleterious light to core modes propagating in the opposite direction. Likewise, incoming useful light is carried by core modes. The filter transmits the useful light without coupling it to either core modes or cladding modes propagating in the opposite direction.

To more clearly understand the characteristics of the present filter, the following sections expose theoretical considerations useful to the understanding of the physics behind the operation of the optical device and its components.

Optical Fiber

In its most simple form, an optical fiber comprises a core with an index of refraction $n_{co}$, embedded in a cladding with an index of refraction $n_{cl}$ that is lower than the core index, i.e.

$$n_{cl} < n_{co} \tag{1}$$

Both the core and cladding are made of a glassy material with a low attenuation at optical wavelengths. The cladding is covered with a polymer coating.

The optical field of light traveling in an optical fiber can be decomposed as a superposition of modes, a mode being a transversal field distribution that maintains its shape as it propagates along the fiber. Assuming the fiber is aligned with axis z, the optical field of a mode propagating along the fiber varies according to:

$$\exp\left(\pm j \frac{2\pi}{\lambda} n_{eff} z\right) \tag{2}$$

where the sign depends on the direction of propagation, $\lambda$ is the vacuum wavelength of the light guided by the fiber and $n_{eff}$ is the effective index of the mode. The modal field distribution and the effective index vary from mode to mode. Moreover, they are dependent on the transversal structure of the optical fiber and on the wavelength. According to equation (2), a mode can be expressed as a superposition of plane waves that all have the same longitudinal wavenumber $k_z$ equal to $$k_z = \pm j \frac{2\pi}{\lambda} n_{eff} \tag{2}$$

where the sign depends on the direction of propagation. One can distinguish between core modes and cladding modes. Core modes are characterized by an effective index larger than the cladding refractive index, i.e.

$$n_{cl} < n_{eff} < n_{co} \tag{3}$$

The transversal wavenumber $k_t$ of these modes is then imaginary in the cladding since $$k_t = \frac{2\pi}{\lambda} \sqrt{n_{cl}^2 - n_{eff}^2} \tag{4}$$

As a result, a core mode decreases exponentially within the cladding and is confined to and near the fiber core. As a result, core modes do not interact with the polymer coating covering the cladding. On the other hand, the effective index of a cladding mode is smaller than the cladding refractive index, i.e.

$$n_{eff} < n_{cl}. \qquad (5)$$

The transversal wavenumber of a cladding mode remains real in the cladding. As a result, a cladding mode remains oscillatory in the cladding where it can carry a sizable fraction of its power. Contrary to core modes, cladding modes interact with the polymer coating.

The number of core modes guided by an optical fiber increases with the diameter of the core and the difference between the index of refraction of the core and that of the cladding. A single mode fiber is the limiting case of a fiber that carries only one core mode. When polarization is considered, a single mode fiber actually guides two core modes that are orthogonally polarized to one another. In practice, optical fibers have a cladding outer diameter that is much larger than optical wavelengths. As a result, a very large number of cladding modes are supported by the fiber. These modes interact with the polymer coating and are typically attenuated over much shorter distances than core modes. Most applications involving an optical fiber rely ultimately on core modes that are guided with little attenuation.

It is known in the art that optical fibers may differ in practice from this simple description. For example, the index of refraction of the core may vary radially as in graded index fibers. An optical fiber may have multiple claddings to guide pump light used to create an inversion of population in the fiber core containing an active species. Notwithstanding these details, the fact remains that optical fibers generally guide core modes that are confined into and near the core of the optical fiber and cladding modes that extend well outside of the core.

Fiber Bragg Gratings

Fiber Bragg gratings (FBGs) are convenient components for performing various spectral functions inside an optical fiber. They are used extensively in the fields of telecommunications, sensing and fiber lasers [R. Kashyap, *Fiber Bragg Gratings*, Academic Press, 1999; and A. Othonos and K. Kalli, *Fiber Bragg Gratings. Fundamentals and Applications in Telecommunications and Sensing*, Artech House, 1999]. A FBG generally consists in a periodic or quasi periodic modulation of the index of refraction (or refractive index) extending along a segment of an optical fiber (see FIG. 1). This modulation can produce the transfer of optical power from one mode to another inside an optical fiber: the modulation is said to couple two modes together. Two conditions must be met for this transfer of power to take place.

Phase Matching

Each period of a grating scatters a weak optical field from a first mode to a second mode. To achieve a sizable transfer of power from one mode to another, all these weak scattered fields must add up in phase. This first condition, termed phase matching, is a manifestation of the collective nature of the mode coupling: all grating periods must contribute in phase to provide an efficient mode coupling. This intuitive point of view is supported by an electromagnetic analysis of the situation. Mathematically, the phase matching condition between two modes propagating in opposite directions may be expressed as $$\frac{2\pi}{\lambda}(n_{eff1} + n_{eff2}) = \frac{2\pi}{\Lambda} \qquad (6)$$

where $\lambda$ is the wavelength of the light, $\Lambda$ is the period of the index modulation, whereas $n_{eff1}$ and $n_{eff2}$ are the effective indexes of the modes being coupled to one another. This means that a grating with period $\Lambda$ can transfer power from a first mode with effective index $n_{eff1}$ to a second mode with effective index $n_{eff2}$ propagating in the opposite direction when the first mode carries light at wavelength $\lambda$ verifying equation (7). The transfer of power will be much less efficient or even negligible if light is at another wavelength. Likewise, the phase matching condition between two modes propagating in the same direction is met when $$\frac{2\pi}{\lambda}|n_{eff1} - n_{eff2}| = \frac{2\pi}{\Lambda} \qquad (7)$$

According to these equations, longer modulation periods are required to couple two modes propagating in the same direction. A grating designed to couple co-propagating modes is called a long period grating (LPG). In a single mode fiber, a LPG is used to couple the fundamental mode to co-propagating cladding modes. The spectral response of a LPG is quite susceptible to various perturbations, such as a temperature variation, because the phase matching condition depends on the difference between the effective indexes of the modes being coupled. This difference can vary sizably, in relative terms, in the presence of a temperature variation, especially when coupling takes place between a core mode and a cladding mode that have markedly different transversal profiles.

The appellation Fiber Bragg Grating (FBG) is typically reserved in the art to gratings that couple modes propagating in opposite directions. The phase matching condition in a FBG depends on the summation of the effective indexes and the spectral response is more stable in the presence of perturbations. In considering the coupling between counter-propagating modes, only equation (6) needs to be considered in the description below. According to equation (6), the phase matching condition between two given modes is verified at a specific wavelength that depends on the modulation period and on the effective index of the modes, i.e.

$$\lambda = (n_{eff1} + n_{eff2})\Lambda \qquad (8)$$

The phase matching condition thus leads to a longitudinal requirement: for the grating to couple two given modes at wavelength $\lambda$, the period of the grating must verify equation (8). In general, the effective index of each mode depends on the wavelength. This complicates the evaluation of the wavelength at which the coupling between two given modes takes place for a given grating period. Likewise, this must be taken into account when determining the grating period required for coupling two given modes at a target wavelength.

The wavelength at which phase matching is realized depends on the effective indexes of the modes being coupled. In the case of a grating present in an optical fiber supporting many modes, each mode having a specific effective index, the phase matching can be realized at multiple wavelengths, each wavelength being associated to a given pair of modes. The fundamental mode of an optical fiber has the largest effective index $n_{eff0}$. The longest wavelength at which phase matching is realized is thus equal to $$\lambda_B = 2n_{eff0}\Lambda \quad (9)$$

Wavelength $\lambda_B$, at which the fundamental core mode of a fiber is reflected on itself by a grating of period $\Lambda$, is called the Bragg wavelength. This appellation stems from the fact that, historically, FBGs have been used mostly to reflect the core mode of a single mode fiber at wavelength $\lambda_B$.

Scattering Efficiency

The phase matching condition determines the wavelength at which a grating of a given period can couple a first mode to a second mode. Whether this coupling actually takes place depends on a second condition, i.e. the scattering efficiency from the first mode to the second mode. Even though the phase matching condition is met, no transfer of power takes place if each individual grating period scatters no power from the first mode to the second mode. To illustrate this point further, let us consider a FBG with index modulation fringes that are normal to the axis of the optical fiber, as shown in FIG. 1. It is further assumed that the spatial extent of the index modulation normal to the optical fiber axis is sufficient to completely intercept a given mode. Since the phase front of a mode in an optical fiber is a plane normal to the fiber axis, it is understood that a grating as just described can only reflect the mode on itself. In other words, under these conditions, coupling can only occur between an incident mode and the same mode propagating in the opposite direction.

As a next step, it is assumed that the index modulation does not completely intercept an incoming mode. In this case, each grating period acts as a finite area mirror that reflects only part of an incoming beam. Reflection of an incoming field by a finite area mirror produces a reflected field with a plane wave angular spectrum different from that of the incoming field, more so if the transversal area of the mirror is small relatively to the transversal area of the incoming field. In an optical fiber, reflection by a grating with a transversal extent smaller than that of an incoming mode is thus expected to scatter some light towards other modes.

Figure 2A:
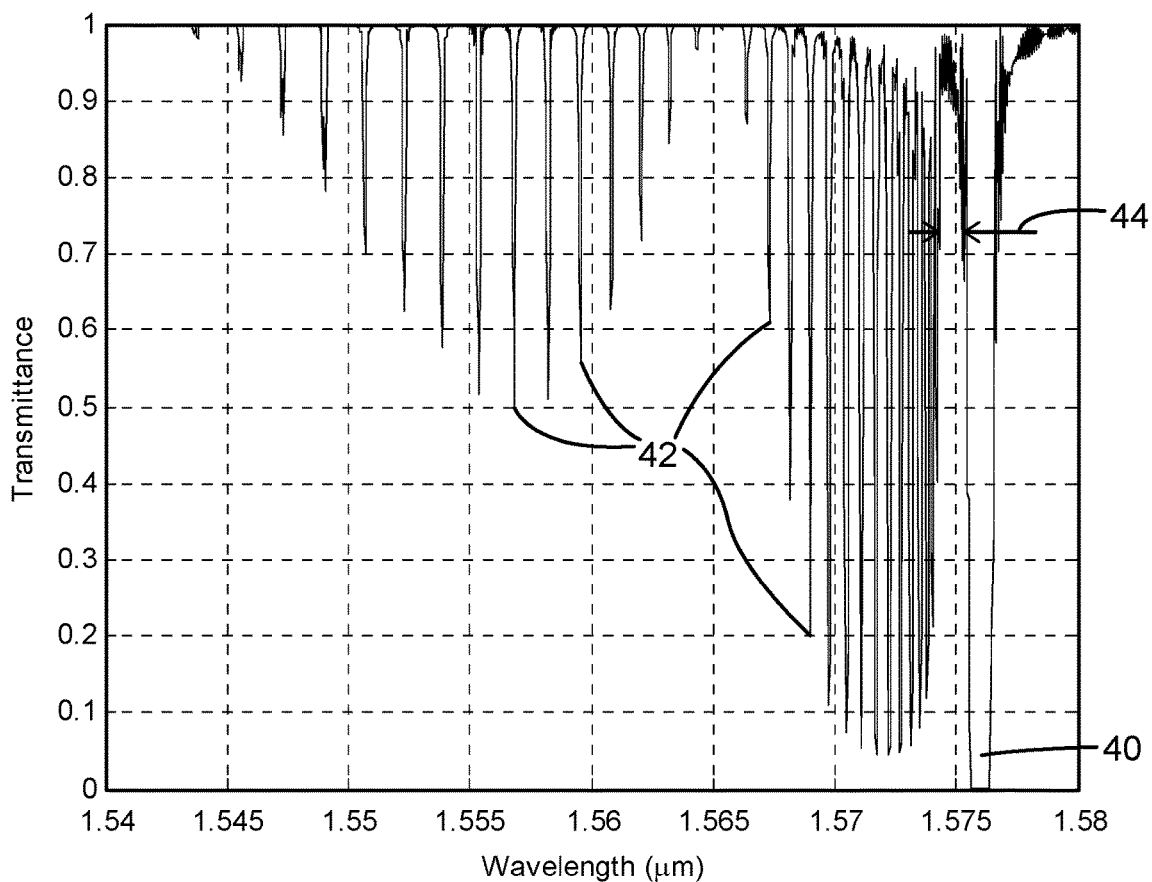
FIG. 2a is a graph of the transmittance of a simulated strong FBG written in a SMF28 fiber in which only the core is photosensitive with a Bragg wavelength of 1.576 µm.
Figure 2B:
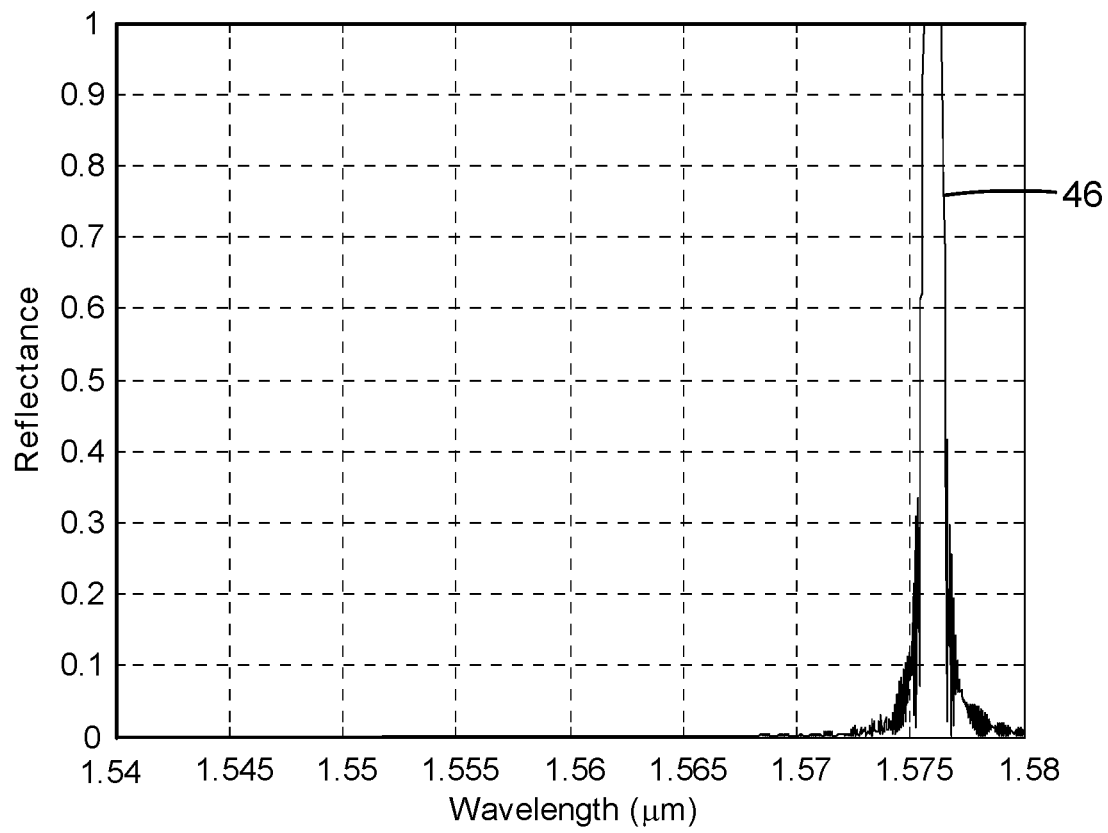
FIG. 2b is the reflectance of the same simulated FBG.
Figure 3:
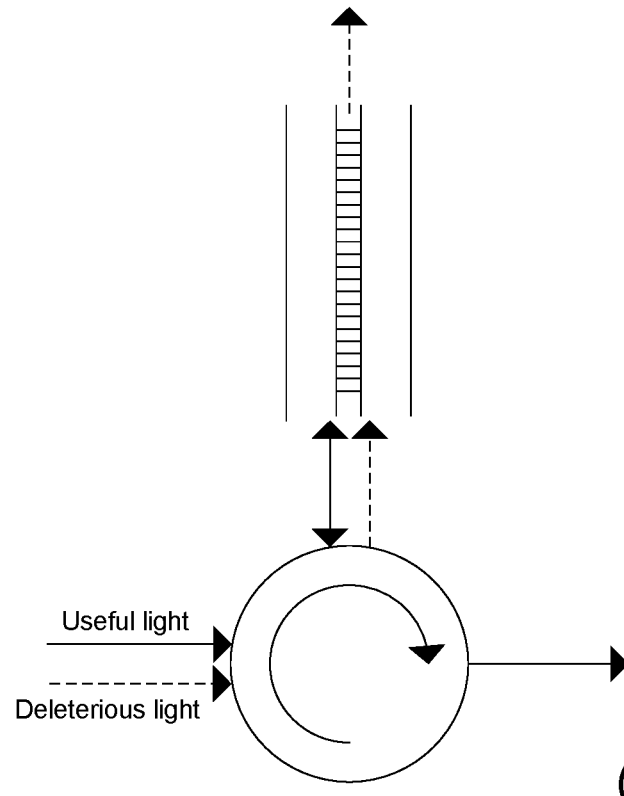
FIG. 3 (PRIOR ART) shows a configuration using a uniform period FBG coupled to a circulator to separate useful light from wideband deleterious light according to prior art.

This situation is encountered in practice in single mode fibers in which the FBG is limited to the fiber core. Since a core mode extends somewhat outside of the core, scattering towards other modes is expected. In a single mode fiber carrying only one core mode (excluding polarization considerations), optical power gets scattered towards cladding modes. When the fundamental core mode in such a fiber is incident on a grating, one observes in transmission a dip at the Bragg wavelength 40 predicted by equation (9) and a series of dips at shorter wavelengths resulting from the coupling to various cladding modes with smaller effective index, as shown in FIG. 2a. This graph was obtained by simulating a strong FBG written in a SMF28 fiber in which only the core is photosensitive. The Bragg wavelength of the grating was 1.576 µm. There is a narrow spectral gap 44 between the Bragg wavelength and the wavelength at which coupling to a first cladding mode occurs. This gap is wider in an optical fiber with a large numerical aperture and is typically between 1 and 5 nanometer wide, but could be as small as 0.1 nanometer or smaller. In reflection, a single peak 46 is observed at the Bragg wavelength because cladding modes to which optical power has been coupled by the grating are typically attenuated prior to detection (see FIG. 2b). In most applications where reflection of the core mode in the fiber core is of interest, such loss of power to cladding modes is considered a nuisance. This is the case, for example, when a FBG is used to reflect a communications channel at wavelength $\lambda_B$ and transmit unhindered channels located at other wavelengths. Coupling to cladding modes can then induce losses to channels located at wavelengths shorter than $\lambda_B$. Indeed, to avoid such coupling to cladding modes, optical fibers have been developed with a photosensitive area extending outside of the fiber core in order for the grating to intercept the entire core mode [J. M. Kim et al., *Suppression of cladding-mode coupling loss in fiber Bragg gratings by independent control of refractive index and photosensitive profiles in a single-mode optical fiber*, IEEE Photonics Technology Letters 12, 1504-1506 (2000); and V. Bhatia et al., Fiber Bragg grating with cladding mode suppression, U.S. Pat. No. 6,351,588].

Mathematically, the scattering efficiency between two modes is calculated with a superposition integral involving the transversal profiles of the FBG index modulation and of the modal fields. This integral must usually be evaluated numerically, but symmetry arguments can be invoked to determine which family of modes can be coupled to one another. For example, a cylindrically symmetric grating written in a cylindrically symmetric optical fiber can only couple modes that have the same azimuthal variation. A cylindrical asymmetry in the index modulation, resulting for example from the side-writing procedure used to inscribe the grating in the optical fiber, can lead to coupling between modes of different azimuthal orders. Finally, a stronger index modulation translates into a stronger scattering efficiency. The amplitude of the refractive index modulation can be adjusted to determine the level of power transfer between coupled modes.

Chirped Gratings

The coupling between two modes with effective index $n_{eff1}$ and $n_{eff2}$ is most effective at a wavelength defined by equation (8). The spectral bandwidth over which this coupling remains significant depends on the length of the grating and on the amplitude of the index modulation. A long grating with a weak index modulation couples two modes over a narrow wavelength range. The coupling spectral bandwidth is increased by shortening the grating and increasing the amplitude of the index modulation. At 1550 nm, this typically allows bandwidths on the order of a couple of nanometers.

Figure 4:
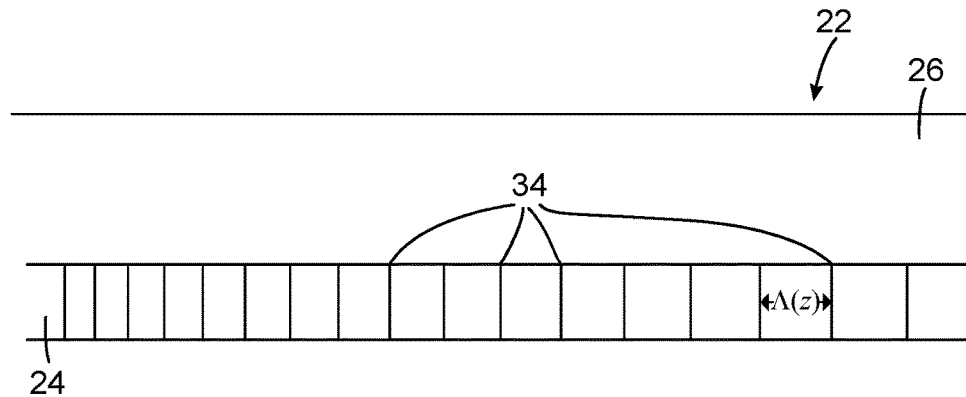
FIG. 4 is a schematized representation of a CFBG.

A preferred way of increasing the coupling bandwidth is by varying the modulation period along the grating. The grating is then said to be chirped and is identified in the following as a Chirped Fiber Bragg Grating or CFBG (see FIG. 4). The wavelength of maximum coupling between two modes then varies along the grating and the coupling spectral bandwidth of the whole grating can be determined mostly by the period variation along the grating. Bandwidths of many tens of nanometers can be obtained at 1000 nm and 1550 nm. Moreover, the position at which light is reflected by a CFBG depends on the wavelength. In a single mode fiber supporting a single core mode, a CFBG with a monotonous period variation provides an unambiguous group delay as a function of wavelength, which can be used to compensate for the dispersion of an optical fiber link. Dispersion compensation in optical fiber communications links is a major application of CFBGs.

Figure 5A:
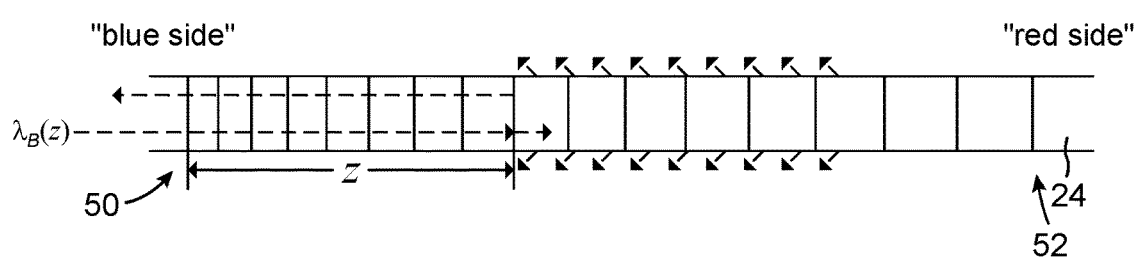
FIG. 5a (PRIOR ART) is a schematized representation of the use of a CFBG to filter light, according to prior art.
Figure 5B:
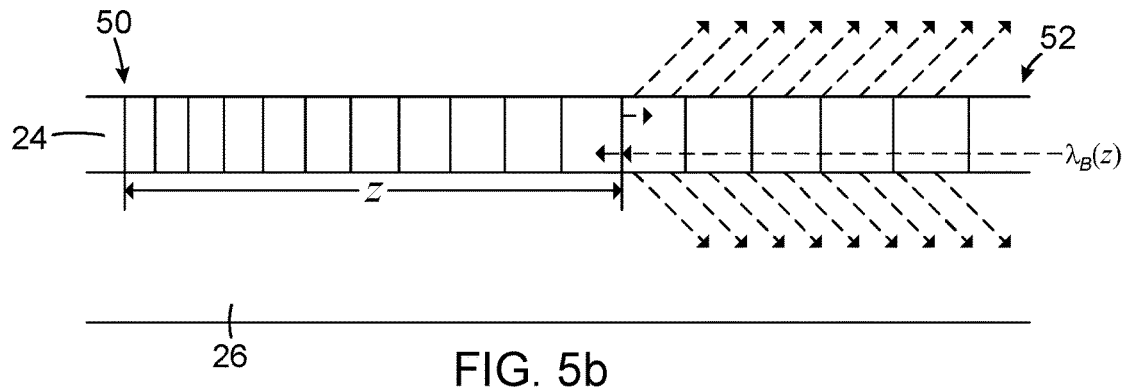
FIG. 5b illustrates a use of a CFBG avoided in the prior art.

In most applications, a CFBG is used to reflect light into the fiber core. The coupling to cladding modes requires special consideration. To simplify the discussion, we consider a CFBG in a single mode fiber. Equation (9) is rewritten as $$\lambda_B(z) = 2n_{eff0}\Lambda(z) \quad (10)$$

to highlight the variation of period $\Lambda$ as a function of position z along the grating, leading to a local Bragg wavelength $\lambda_B(z)$ that depends on position z as well. At position z, a CFBG can reflect light at the local Bragg wavelength $\lambda_B(z)$ in the core mode, but it can also couple light at wavelengths shorter than $\lambda_B(z)$ to cladding modes. To avoid losses to cladding modes, a CFBG is typically used with light incident from the side where the grating period is the shortest. Light then propagates freely into the FBG until it encounters the grating period where condition (11) is met, at which point it gets reflected into the fiber core (see FIG. 5a). Past that point, the small fraction of light that has not been reflected into the fiber core can get coupled to cladding modes. In the opposite case, light encounters first longer periods that can couple it to cladding modes (see FIG. 5b). Some of the light is thus lost before it gets reflected into the fiber core. The incurred loss is generally larger at shorter wavelengths that must travel farther along the CFBG before being reflected into the fiber core. In the usual jargon, it is preferable to enter a CFBG from the blue side 50 (see FIG. 5a) rather than from the red side 52 (see FIG. 5b) to avoid losses to cladding modes [M. Durkin et al., *Equalisation of spectral non-uniformities in broad-band chirped fibre gratings*, in Proc. OSA Technical Digest BGPP '97, vol. 17, paper BMG16.1-3, 231-233 (1997)].

Slanted Gratings

Figure 6:
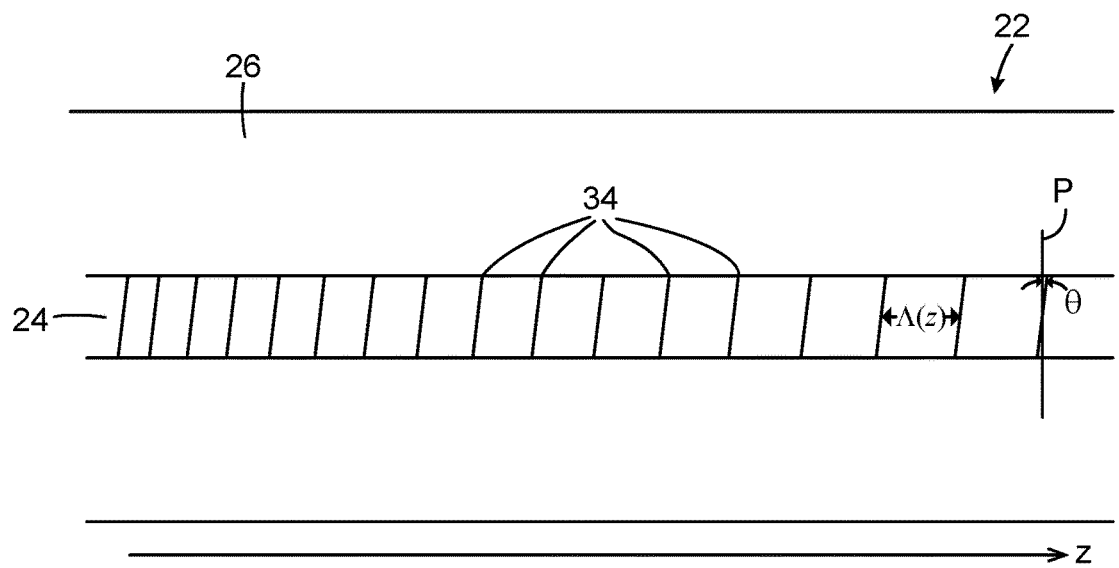
FIG. 6 is a schematized representation of a CSFBG.
Figure 7A:
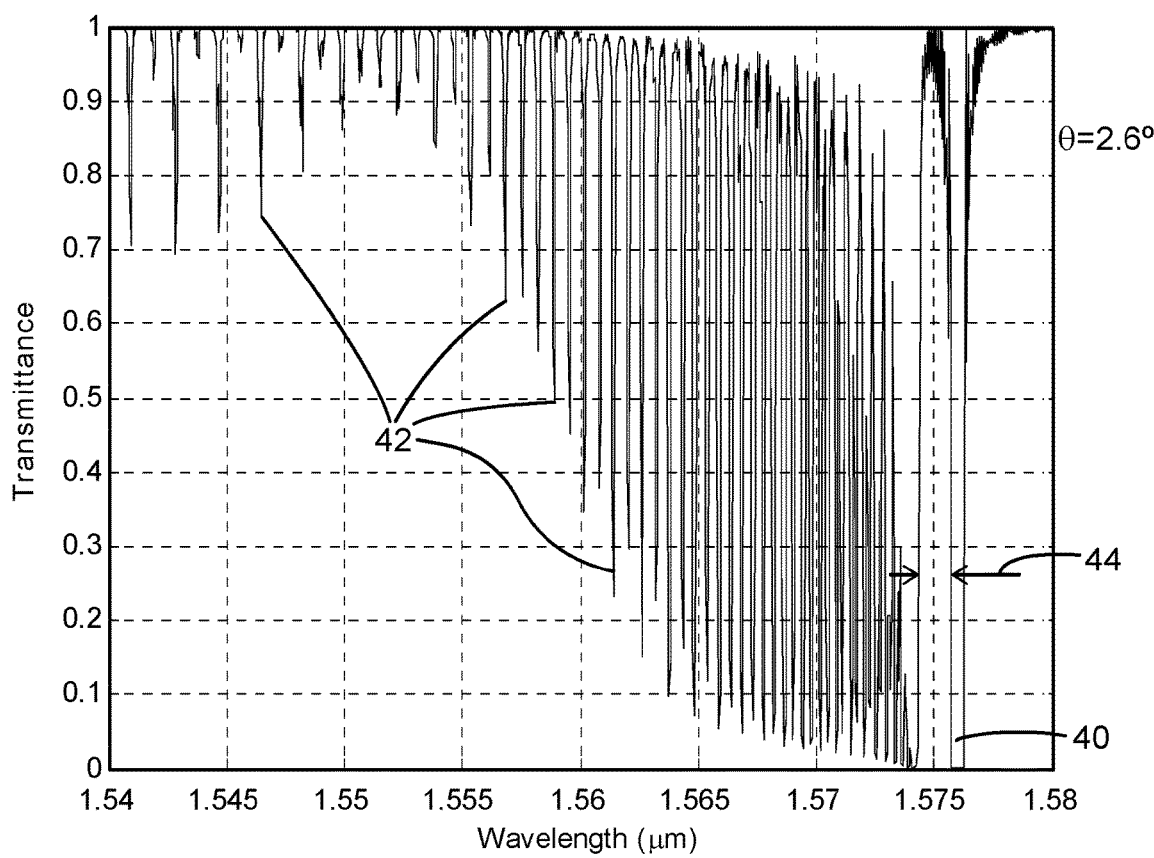
FIGS. 7a and 7b present the transmittance calculated with the same grating as in FIG. 2, but with a small tilt angle of the grating fringes equal to 2.6 degrees (FIG. 7a) or 5.2 degrees (FIG. 7b) respectively.
Figure 7B:
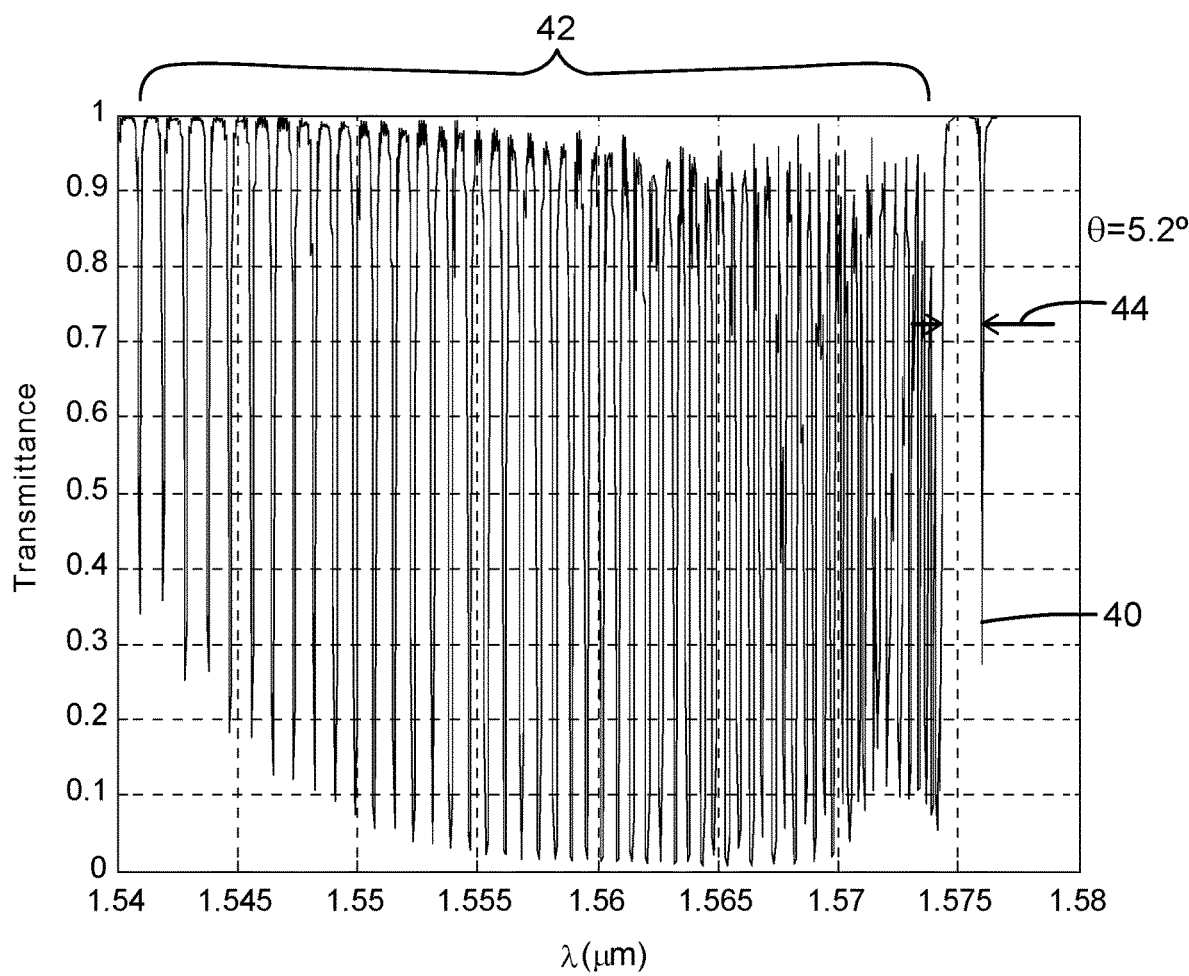

As aforementioned, an asymmetry in the transversal profile of the refractive index modulation allows the coupling of modes with different azimuthal symmetries. Such asymmetry can be introduced on purpose by tilting the fringes of the index modulation. A FBG with index modulation fringes that are not perpendicular to the axis of the fiber, as illustrated in FIG. 6, is often called a slanted FBG and is identified as a SFBG in the following. Tilting the fringes favors the coupling of core modes to cladding modes. The transmission spectrum of a SFBG in a single mode fiber is reminiscent of that of a strong grating that intercepts only a portion of an incoming core mode; it presents a series of dips 42 at wavelengths shorter than the Bragg wavelength defined in equation (9). FIGS. 7a and 7b present the transmittance calculated with the same grating as in FIG. 2, but with a small tilt angle of the grating fringes equal to 2.6 degrees (FIG. 7a) or 5.2 degrees (FIG. 7b). By comparing with FIG. 2, it can be seen that tilting the grating fringes favours the efficient coupling of the fundamental core mode to more numerous cladding modes. A slight spectral gap remains between the Bragg wavelength and the wavelength at which coupling to cladding modes begins.

The highly structured transmittance of a SFBG is not always desirable and can be smoothed by chirping the SFBG [I. Riant et al., U.S. Pat. No. 6,321,008, (supra)]. In the following, a chirped and slanted FBG is noted as CSFBG (as shown in FIG. 6). In a CSFBG, each segment of the grating with a relatively uniform period produces a highly structured transmittance. However, the highly structured transmittances from segments with different periods are shifted spectrally from one another. The combination of these spectrally shifted transmittances results in a global transmittance that is wideband and smooth, as shown in FIG. 10b.

A CSFBG can thus provide wideband optical attenuation, for example over more than 10 nanometers, by coupling light from the fiber core to the cladding. As explained above, in a fiber with a single cladding, cladding modes interact with the polymer coating covering the fiber and are typically attenuated over much shorter distances than core modes. When the optical powers involved are moderate, this may suffice to dissipate the power coupled to the cladding modes by the CSFBG. In high power fiber lasers, measures may be needed to get rid of the optical power coupled into the cladding in a more controlled manner. This may be achieved with a segment of optical fiber covered by a polymer coating with an index of refraction that is higher than that of the fiber cladding. In this case, the optical power propagating inside the cladding rapidly escapes into the coating, which is in thermal contact with a heat sink to dissipate the heat generated by absorption of the optical power. In fibers with multiple claddings designed to favor the guidance of pump light, the situation can get more involved. However, the general idea is the same, i.e. provide means allowing the escape of light from the claddings into an attenuating medium that is in thermal contact with a heat sink. Such an arrangement, known in the art as a light stripper, is already used to get rid of residual pump power [A. Wetter et al., *High power cladding light strippers*, Proc. SPIE 6873, 687327 (2008)].

Figure 21:
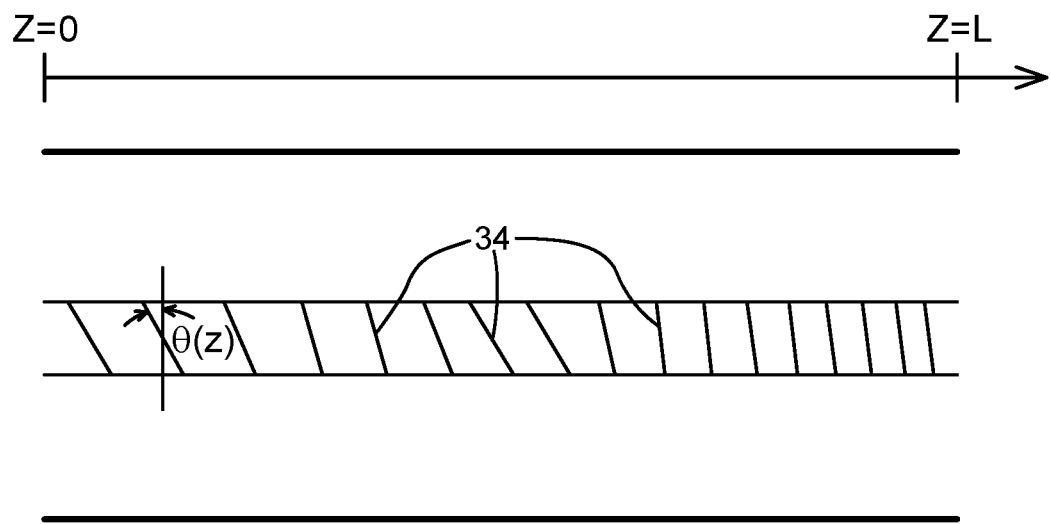
FIG. 21 is a schematized representation of a CFBG having grating fringes with a tilt angle that varies along the grating.

In some implementations, the filter used to attenuate deleterious light or even suppress the generation of deleterious light preferably reflects no light inside the fiber core (deleterious or useful). Contrary to known prior art approaches, devices using filters as described herein do not require the use of a special fiber to achieve an ultralow reflectivity into the fiber core. The reduction in reflectivity is not achieved by optimizing the scattering efficiency through a proper design of the transversal structure of the optical fiber. It is achieved by tailoring the longitudinal variation of the phase matching condition along the grating, ensuring that incoming core modes are coupled to cladding modes before being reflected in the fiber core. Advantageously, ultralow reflectivity can be achieved at moderate tilt angles, i.e. without compromising the ability to define the filter spectral response. In some variants, the moderate tilt angle may be between about 1.5 and 15 degrees. In some embodiments, the tilt angle may be about 2.6 degrees, about 5.2 degrees or any value in-between. This has the further advantage of minimizing the dependence of the spectral response on the polarization. Ultralow reflectivity may also be achieved with strong gratings capable of providing a sizable attenuation of deleterious light. In some variants, such as for example shown in FIG. 21, the tilt angle of the grating fringes varies along the FBG.

Active Tuning

Various embodiments of optical filters described herein may be combined with or involve an active tuning mechanism coupled to one or more FBGs. Tuning of the grating may be used to fine tune the properties of the FBG to obtain a desired local average effective refractive index or Bragg wavelength.

As known in the art, the wavelength of peak reflection for a Bragg grating can be shifted by a change in either the strain or the temperature (or both) imposed on the grating. If the optical fiber segment hosting the Bragg grating is subject to a strain or temperature gradient, the modulation period of the index of refraction pattern and the mean index of refraction can be modified with the goal of fine-tuning the dispersion characteristic of the grating. The tuning mechanism may therefore include an assembly changing the strain applied to the optical fiber segment hosting the FBG, an assembly applying a temperature gradient to this optical fiber segment, or a combination of both.

In some implementations, the tuning mechanism may be configured to apply a strain or temperature variation which is non-uniform along the grating, that is, locally changing the temperature or strain along different portions of the grating. As will be readily understood by one skilled in the art, a non-uniform heating or strain induces a chirp in the grating, or modifies a pre-existing chirp. Controlling the magnitude of the thermal gradient or strain variation controls the magnitude of the resulting chirp, and thus there is provided a form of local adjustment of the spectral reflectivity of the grating.

Figure 8:
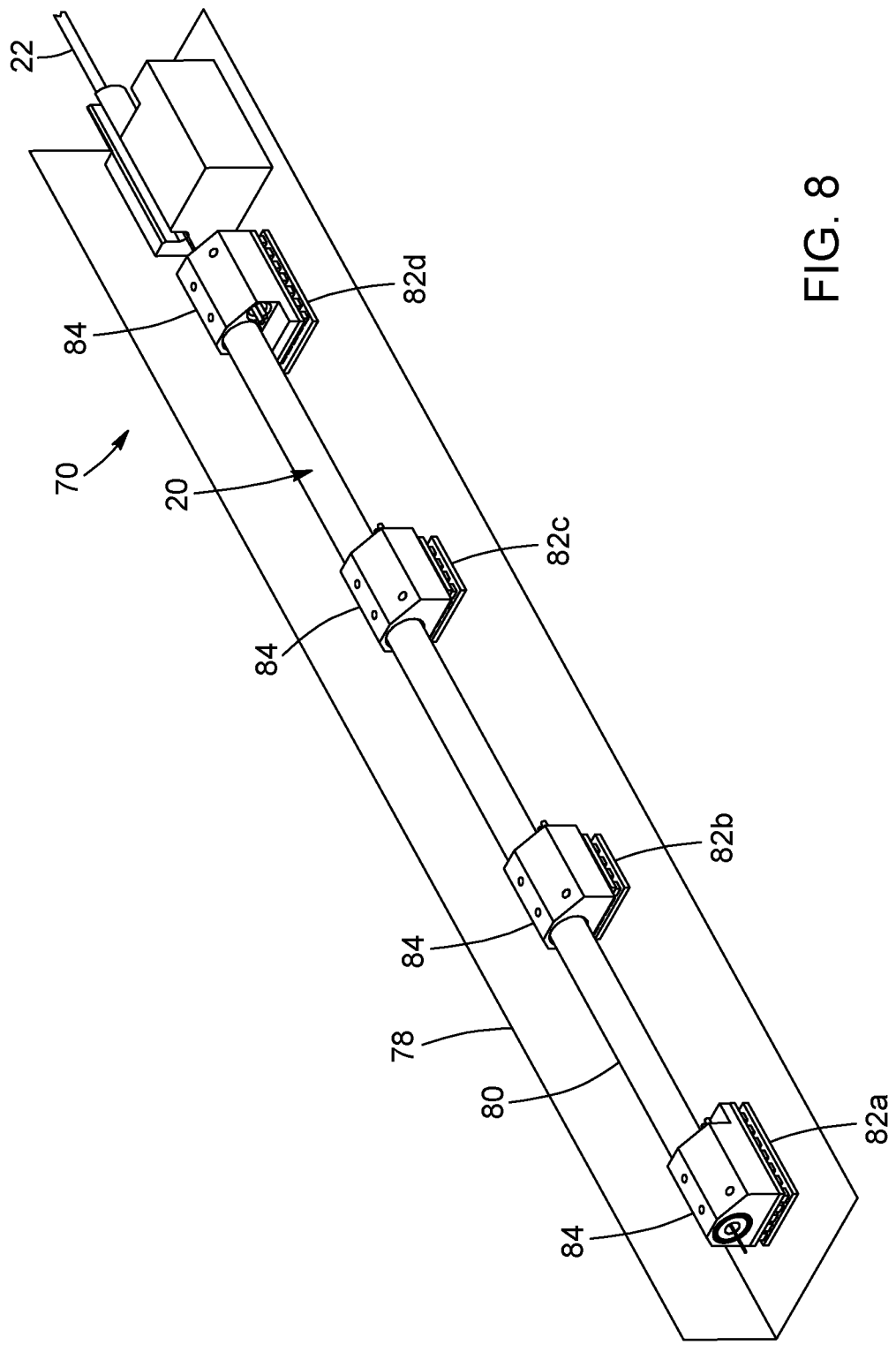
FIG. 8 is a partial cross-sectional side elevation view of a tuning mechanism applying a temperature gradient on a CSFBG according to one implementation.

Referring to FIG. 8, there is shown an example of a tuning mechanism 70 imposing a thermal gradient on a FBG embodying an optical filter 20. In this variant, the optical fiber 22 hosting the FBG is preferably in close contact or proximity with an elongated heat conductive member called herein the natural gradient tube 80, inside which the fiber 22 rests freely. The natural gradient tube 80 may have a cylindrical hollow shape and is preferably made of a good heat conductor, typically a metal. The natural gradient tube 80 allows a uniform heat transfer along its length and thus creates a smooth temperature profile along the fiber. Advantageously, the natural gradient tube 80 can isolate the fiber 22 from surrounding temperature perturbations.

In some variants, a thermal compound may be provided between the natural gradient tube 80 and the host optical fiber 22 to ensure a good replication of the temperature profile along the natural gradient tube in the fiber. In such an embodiment, the optical properties of the FBG are advantageously unaffected by the contact between the optical fiber and the natural gradient tube, and long-term reliability is promoted as no mechanical stress is applied to the optical fiber at any point. Within this preferred embodiment, the fiber can remain unaffected by the thermal expansion (or contraction) of the metallic tube, since they are not mechanically coupled to one another.

The natural gradient tube 80 may further be thermally isolated from its surroundings to ensure the quality of the induced thermal profile. A Dewar type thermos system, with an inner shield to improve radiation isolation, can be used for this purpose. A low emissivity construction, using for example a rod with a mirror finish surface, may be used to further improve the performance of the device.

Referring still to FIG. 8, in the illustrated variant the tuning mechanism 70 includes four heat pumping elements 82a, 82b, 82c and 82d affixed in close physical contact to the natural gradient tube 80. As will be readily understood, a different number of heat pumping elements may be provided. The heat pumping elements 82 are distributed, evenly or unevenly, along the length of the natural gradient tube 80. The contact between the natural gradient tube 80 and each heat pumping element 82 may be ensured using an appropriate technique such as pressure mounting with a thermal compound, thermal gluing, soldering, or the like. In some variants, the contact between the natural gradient tube 80 and the heat pumping elements 82 may be indirect, using thermal bridging components 84. The heat pumping elements 82 may for example be embodied by Peltier effect Thermo Electric Coolers, referred hereafter as TECs. The TECs are configured to pump heat from one side of their body to the other, thereby controlling the temperature of the natural gradient tube at the point of contact therebetween. The thermal conductivity of the natural gradient tube 80 allows the heat distribution along the tube 80 to settle into a smooth temperature profile between the fixed temperature points provided by the heat pumping elements 82.

The tuning mechanism 70 may further include one or more temperature sensors (not shown) placed in close proximity to the natural gradient tube 80. The temperature sensor may for example be embodied by a thermistor or a resistance temperature detector (RTD). By way of example, a RTD may be provided in association with each heat pumping element 82a, 82b, 82c and 82d. Each temperature sensor is affixed in close contact with the natural gradient tube 80 using an appropriate technique, for example using a thermally conductive epoxy. Signals from the temperature sensors are used as input to a servo control system (not shown) to precisely control, that is, fix and maintain, the temperature profile along the grating. Such means for temperature control are well known in the art, and typically include appropriate control electronics and drivers such as TEC controllers with PID servo-control for optimum dynamic operation.

In some implementations, the TECs 82 are directly mounted on a heat sink 78. The heat sink 78 may for example be embodied by a standard dissipative heat sink provided with fins, or more simply by a large heat dissipation plate. In other variants, the heat sink 78 may be embodied by a metallic casing used for packaging the FBG, such as shown in the variant of FIG. 8. In further variants, the TECs 82 may be mounted on a thermally conductive metallic recirculation bar (not shown) to improve the energy efficiency of the whole device. Such an assembly is for example shown in Canadian patent applications no. 2,371,106 and 2,383,807 (LACHANCE et al).

Of course, other configurations may be used to provide a tuning mechanism couple to the FBG. By way of example, in other variants to tuning mechanism may involve the application or modification of a strain profile along the optical fiber hosting the FBG.

Embodiments and Uses of Optical Filters

Figure 9A:
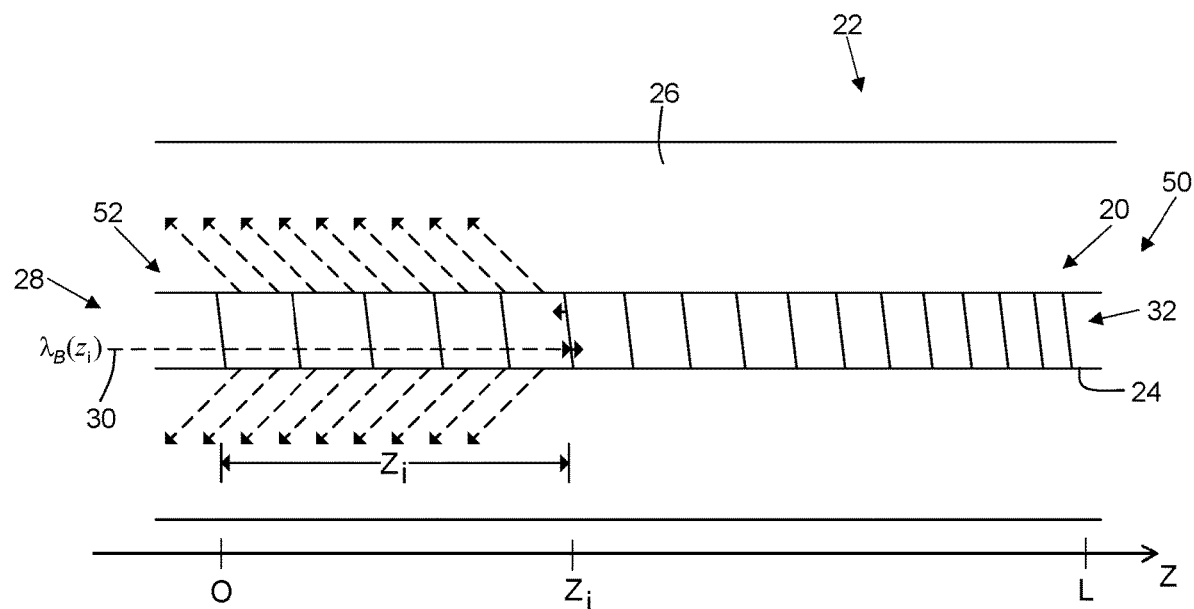
FIG. 9a is a schematized representation of the use of a CSFBG in an optical fiber path with light entering from the red side.

Referring to FIG. 9A, the configuration of an optical filter 20 according to a first embodiment is schematically illustrated.

The optical filter 20 is provided in an optical fiber 22 having a core 24 and a cladding 26, the filter 20 extending along the core 24 of this fiber 22. The filter 20 consists in a CSFBG having the following specific property: the period of the refractive index modulation of the CSFBG is largest at the input end 28, where a light beam 30 enters the filter, rather than at the output end 32 of the filter 20, which is contrary to the preferred usage of a CFBG. In other words, light enters from the red side 52 instead of the blue side 50. This orientation of the CSFBG advantageously reduces the reflectivity within the core 24 of the fiber 22 while providing a strong coupling of deleterious light out of the fiber core 24.

Figure 9B:
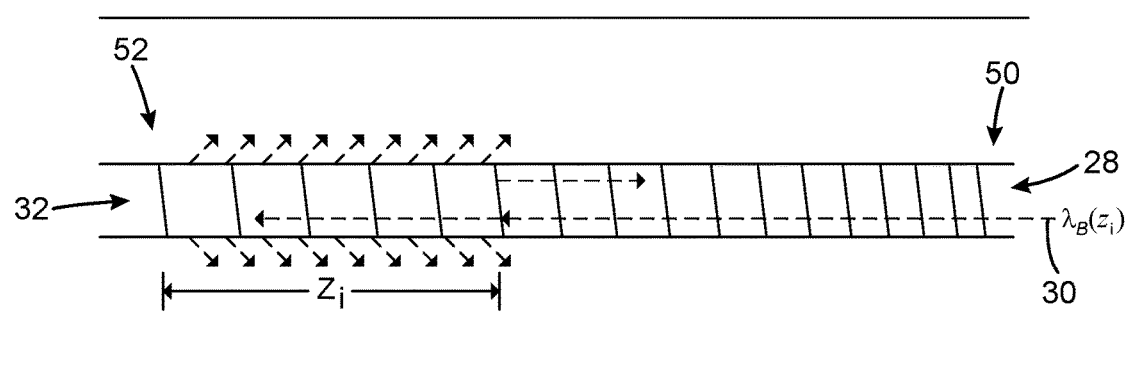
FIG. 9b is a schematized representation of the use of similar CSFBG with light entering from the blue side.

Referring to the longitudinal axis z of the optical fiber 22, let z=0 be the position of the input end 28 of the filter 20 where the period is maximum and z=L be the position of the output end 32 of the filter 20 where the period is minimum, L representing the length of the filter 20. Let light of wavelength $\lambda_i = \lambda_B(z_i)$, where $\lambda_B(z_i)$ is the Bragg wavelength at position $z = z_i$ along the filter ($0 < z_i < L$), be incident on the filter at z=0. For the present discussion, the incoming light is assumed to be carried by the fundamental core mode in a single mode fiber. The phase matching condition for the reflection of the incoming light into the counter-propagating fundamental core mode is met at $z = z_i$. Until the incoming light reaches this position, it encounters modulation fringes with longer periods. As discussed earlier, from a phase matching point of view, grating fringes with periods longer than $\Lambda(z_i)$ can couple the incoming light to counter-propagating cladding modes. Moreover, the fringes of the CSFBG are tilted to enhance the scattering efficiency between the incoming fundamental core mode and counter-propagating cladding modes. The incoming light of wavelength $\lambda_i$ is thus efficiently coupled out of the fiber core 24 and into the fiber cladding 26 prior to being reflected within the fiber core 24 at position $z_i$. Had the light been incident on the filter from the opposite end, it would have been reflected within the fiber core before being coupled out of the fiber core by longer period fringes (see FIG. 9b). This explains that entering the filter from the end of maximum fringe period leads to a much-reduced reflection into the counter propagating core mode. In a properly designed filter, this mechanism has been found to provide a sizable attenuation by coupling into cladding modes and simultaneously a very small reflection into the fiber core. This mechanism cannot operate for incoming light at a wavelength corresponding to the maximum Bragg wavelength $\lambda_B(0)$ of the filter since it is immediately reflected in the fiber core by the front end of the grating. This limitation can be countered by ensuring that the maximum period of the filter translates into a maximum Bragg wavelength that is longer than the maximum wavelength of the deleterious light. As a result, all wavelengths of the deleterious light are coupled out of the fiber core before being reflected into the fiber core and the reflectivity into the core of the filter remains low at all wavelengths that need to be filtered.

Figure 19A:
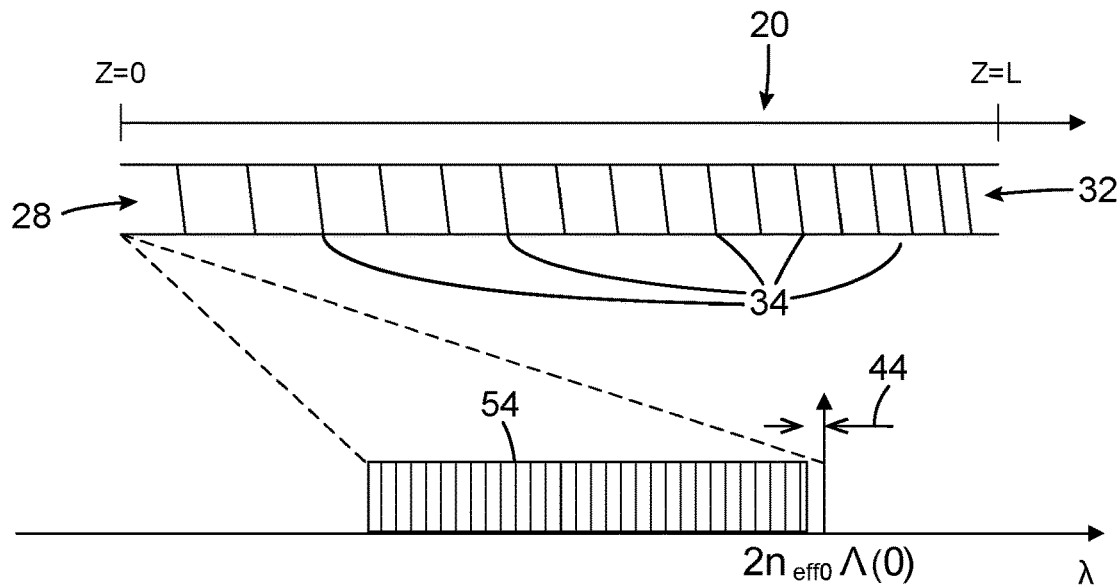
FIG. 19a is a representation of the range of wavelengths at which reflection in the core mode occurs at the input end of a filter according to an embodiment.
Figure 19B:
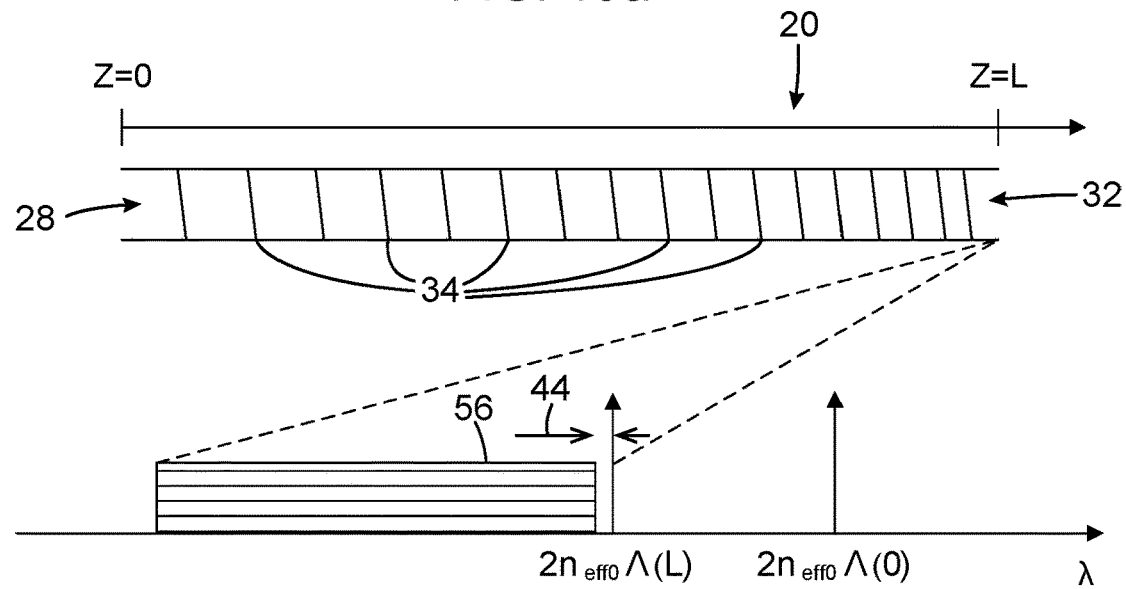
FIG. 19b presents the spectral domain over which light is reflected by fringes at the output end of the same filter.
Figure 19C:
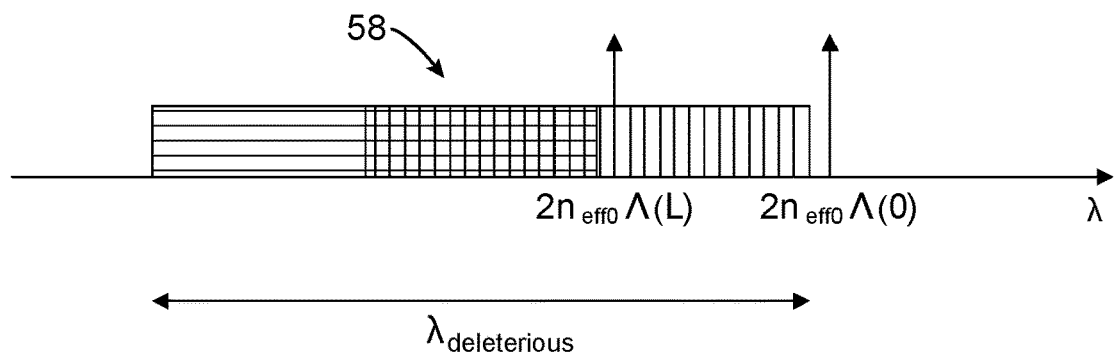
FIG. 19c shows the global spectral domain obtained from the combination of the spectral responses from all positions along the filter.

The operation of an embodiment of the filter is further illustrated in FIGS. 19a to 19c. FIG. 19a displays the grating fringes and the spectral domain 54 over which light is reflected by the grating fringes at the input end of the filter. The vertical arrow represents the Bragg wavelength $2n_{eff0}/\Lambda(0)$ at which these fringes reflect the fundamental core mode unto itself. As aforementioned, this is the largest wavelength that can be reflected by these fringes as determined by phase matching. Incoming light in the fundamental core mode can also be reflected towards cladding modes at wavelengths shorter than the Bragg wavelength. The range of wavelengths at which such reflection occurs at the input end of the filter is represented by the rectangle with vertical lines on FIG. 19a. The slight gap 44 between the Bragg wavelength and the wavelength domain at which reflection into cladding modes occurs is also visible in FIG. 7. According to equation (9), light at a shorter wavelength can be reflected into a cladding mode with a smaller effective index. The leftmost part of the rectangle is thus associated to the reflection of light in cladding modes with a smaller effective index. According to equation (4), cladding modes with a smaller effective index have a larger transversal wavenumber and can be decomposed as a superposition of plane waves that propagate at a larger angle with regards to the fiber axis. The leftmost part of the rectangle is thus associated to the reflection of light into cladding modes that propagate at a larger angle with regards to the fiber axis. A moderate tilt angle of the CSFBG fringes can be chosen to keep at a low value the scattering efficiency between the fundamental core mode and such cladding modes propagating at larger angles with regards to the fiber axis. This appears clearly in FIG. 7, where transmittance dips resulting from coupling to cladding modes are much weaker at shorter wavelengths when a smaller tilt angle is used (FIG. 7a). The width of the rectangle in FIG. 19a can thus be adjusted by a proper choice of the fringe tilt angle.

A spectral graph as shown in FIG. 19a can be associated to each grating period along the filter. As the fringe period gets smaller from the input end to the output end of the filter, the associated spectral response shifts towards shorter wavelengths. FIG. 19b presents the spectral domain 56 over which light is reflected by fringes at the output end of the filter, at which point the fringe period is minimum. The Bragg wavelength is now reduced to $2n_{eff0}/\Lambda(L)$ and the spectral domain 56 over which the fundamental core mode gets reflected into cladding modes, illustrated by the rectangle with horizontal lines, is shifted towards shorter wavelengths as well.

The combination of the spectral responses from all positions along the filter leads to a global spectral domain as illustrated in FIG. 19c. As shown, the spectral domain 58 over which the fundamental core mode gets reflected towards cladding modes by the whole filter, illustrated by the rectangle with both vertical and horizontal lines, should cover at least the spectrum of deleterious light, thus ensuring that it all gets filtered. According to the above discussion, the width of this spectral domain depends on the fringe tilt angle and the fringe period variation along the grating. A larger tilt angle increases the bandwidth of each individual spectral response, whereas a larger period variation produces spectral responses that are more spread apart. In general, it is preferable to keep the tilt angle small. As aforementioned, a small tilt angle allows a better control on the shape of the spectral response and reduces the polarization dependence of the spectral response. Increasing the bandwidth of the spectral domain over which the filter induces losses by coupling to cladding modes is thus better achieved by increasing the fringe period variation along the filter. This, in turn, can be achieved by increasing the rate of change of the fringe period or the length of the chirped grating or both.

The two vertical arrows in FIG. 19c delimit the range of wavelengths at which the fundamental core mode can be reflected unto itself by the filter. As indicated in the figure, most of these wavelengths can also be coupled to cladding modes. As explained above, entering the grating from the red side ensures that coupling to cladding modes occurs before light reaches the point along the grating where it can be reflected into the fiber core: the deleterious light is then attenuated before being reflected in the fiber core. To avoid any reflection of deleterious light into the fiber core, the deleterious light wavelength should further be smaller than the Bragg wavelength at the input end of the grating as shown in FIG. 19c.

A properly designed filter should avoid attenuation of the forward propagating useful light, either by reflection into the fiber core or by coupling to cladding modes. Reflection into the fiber core is avoided when the useful light wavelength is either smaller than the minimum Bragg wavelength $2n_{eff0}/\Lambda(L)$ or larger than the maximum Bragg wavelength $2n_{eff0}/\Lambda(0)$. Graphically, this means that the useful light wavelength is not between the two vertical arrows in FIG. 19c. Likewise, attenuation by coupling to cladding modes is avoided as long as the useful light wavelength is not within the spectral region over which such coupling can occur. Graphically, this means that the useful light wavelength is not found within the rectangle in FIG. 19c. To explain how these requirements impact the design of the filter, two cases must be considered.

In a first situation, the useful light has a wavelength larger than the deleterious light. In this case, it suffices that the period of the CSFBG at any position $z_i$ be shorter than the period required for phase matching between counter-propagating fundamental core modes at the wavelength of the useful light. In other words, the Bragg wavelength $2n_{eff0}/\Lambda(Z_i)$ is shorter than the useful light wavelength at all points along the filter. Graphically, this means that the useful light wavelength is at the right of the rightmost vertical arrow in FIG. 19c. As made clearly visible by FIG. 19c, this also ensures that no reflection of the useful light can occur into counter-propagating cladding modes. In such a filter, the absence of any reflection of the useful light thus rests on the lack of phase matching between the fundamental core mode and any other mode of the fiber at the useful light wavelength.

In a second situation, the useful light has a wavelength shorter than the deleterious light. In this case the filter can be designed with a period that is at all points too long to provide phase matching for reflection of the useful light into the counter-propagating fundamental core mode. In other words, the filter is designed such that the Bragg wavelength $2n_{eff0}/\Lambda(Z_i)$ is larger than the useful light wavelength at all points along the filter. This ensures that the useful light is not reflected into the fiber core. Graphically, this means that the useful light wavelength is at the left of the leftmost vertical arrow in FIG. 19c. FIG. 19c makes it clear that this condition may not always be sufficient to ensure a proper operation of the filter, since the useful light wavelength may still be found in the rectangle identifying the spectral domain over which coupling to cladding modes can take place. To avoid attenuation of the useful light by coupling to cladding modes, it is also necessary that the spectral region over which the coupling to cladding modes occurs does not extend to a wavelength short enough that it includes the wavelength of the useful light. As explained above, the shorter wavelength limit at which coupling to cladding modes can occur can be adjusted by a proper choice of the grating period variation and of the fringe tilt angle. Graphically speaking, this means that the grating period variation and the fringe tilt angle must be designed such that the rectangle in FIG. 19c does not extend down to the useful light wavelength. In such a filter, the absence of any reflection of the useful light thus rests on a lack of phase matching between counter-propagating fundamental core modes at the useful light wavelength, but also on a reduced scattering efficiency between the fundamental core mode and cladding modes at the useful light wavelength.

Figure 10A:
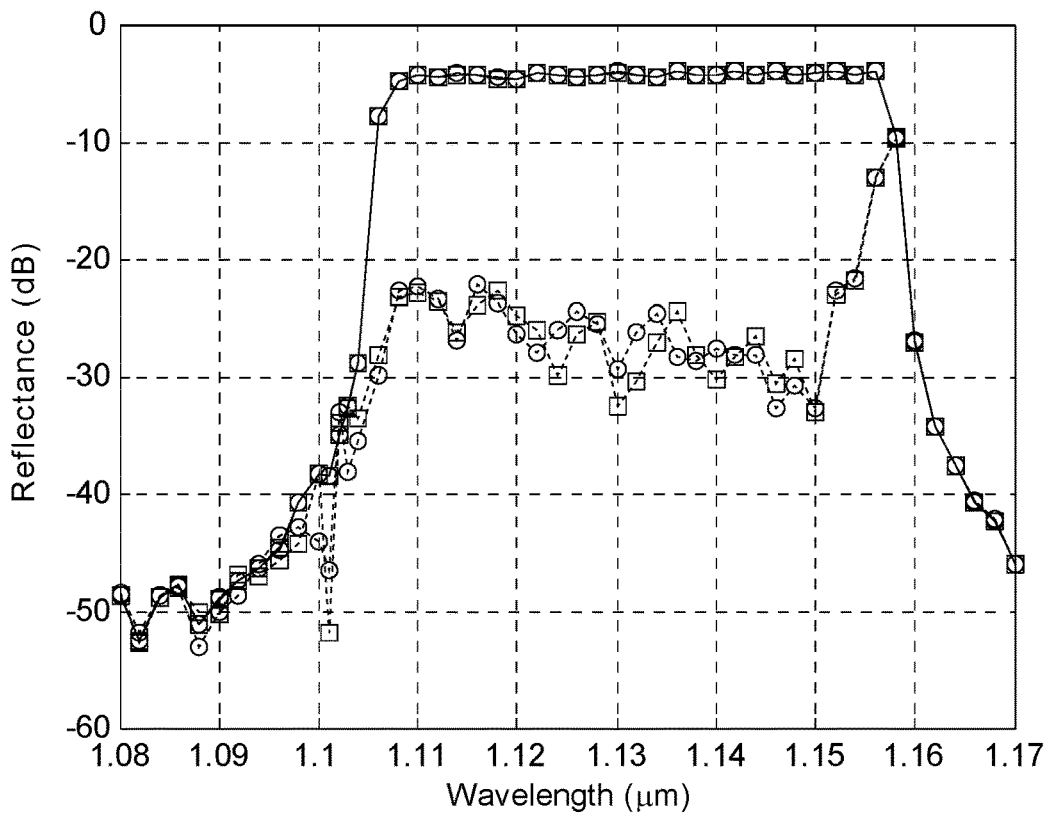
FIG. 10a shows the reflectance of a simulated CSFBG used in accordance with the configurations shown in FIG. 9a. (dotted lines) and FIG. 9b (solid lines).
Figure 10B:
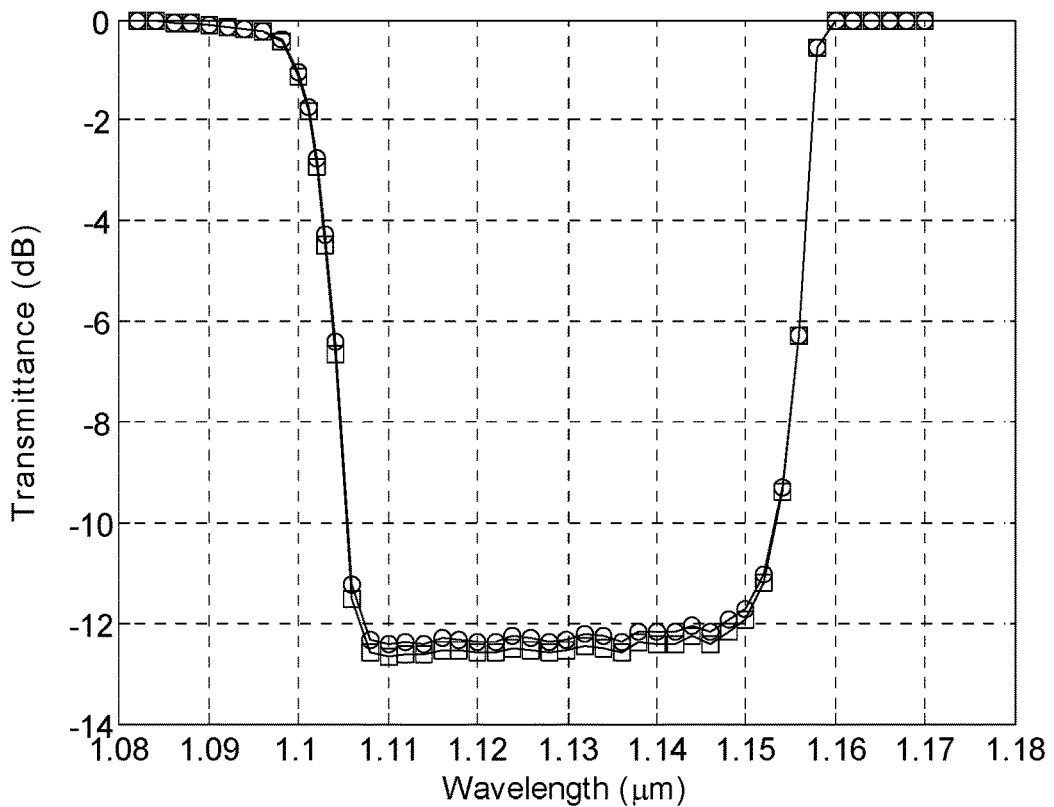
FIG. 10b shows the transmittance of a simulated CSFBG, that is similar for the configurations of FIG. 9a and FIG. 9b.

FIGS. 10a and 10b present the simulation results of a CSFBG such as the one of FIG. 9a in a SMF28 fiber. The graphs present the reflectance and transmittance of the fundamental core mode polarized either in the plane of incidence of the grating fringes (p-polarized, circles) or perpendicularly to the plane of incidence of the fringes (s-polarized, squares). The small tilt angle of the fringes (2.6 degrees) leads to a very slight dependence of the spectral response on polarization. For example, in the attenuation band of the filter where the transmittance goes down to −12.5 dB, the polarization dependence is less than 0.3 dB. The transmittance does not depend on the side from which light enters the CSFBG. However, the filter is clearly unidirectional as far as achieving a low reflectance is concerned. When light enters the CSFBG from the blue side (solid lines), the reflectance reaches over −4 dB, i.e. nearly 40% of the light is reflected by the grating. On the other hand, when light enters the CSFBG from the red side (dotted lines), the reflectance within the attenuation band is smaller than −22 dB, i.e. less than 0.6% of the light is reflected within the fiber core. Also visible is the increase of the reflectance for light incident from the red side at wavelengths long enough for the fundamental mode to be reflected early in the grating before enduring losses to the cladding modes.

Figure 20:
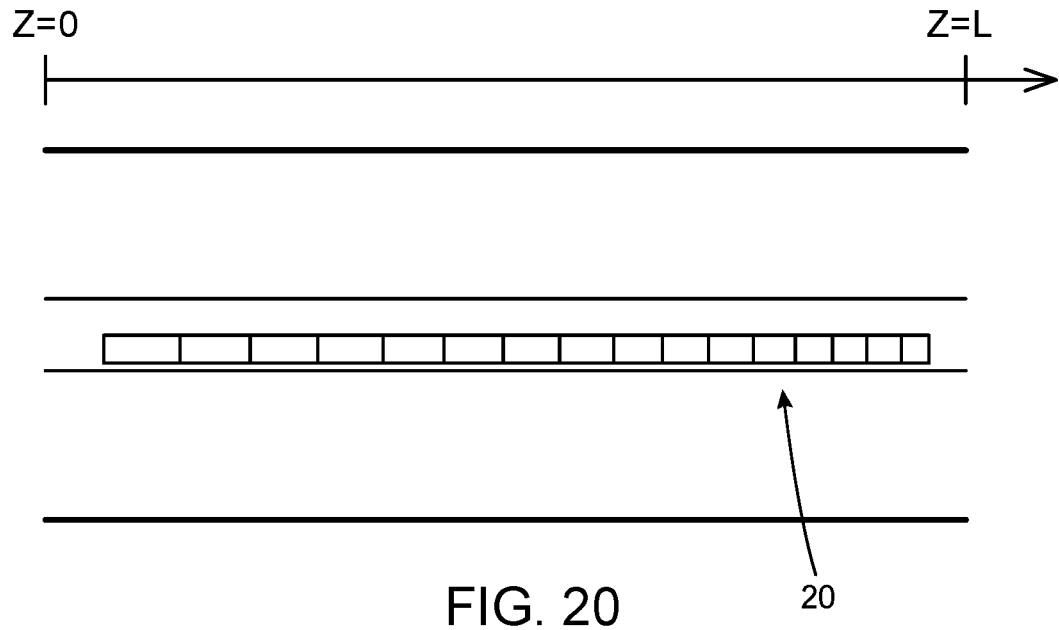
FIG. 20 is a schematized representation of a CFBG having grating fringes covering a portion only of the core.

As aforementioned, gratings written in an optical fiber with a photosensitive area not covering the complete transversal profile of an incoming core mode can couple this mode to cladding modes, even in the absence of any fringe tilt. This effect can take place in an optical fiber where only the core is photosensitive. It can be further enhanced by grating fringes covering a portion only of the core, such as illustrated in FIG. 20. (Grating fringes covering a portion only of the core can be produced for example with a femtosecond laser.) In such a case, the mechanism of operation of the inventive filter can take place with grating fringes normal to the fiber axis. In principle, a CFBG can thus be used instead of a CSFBG in some implementations of the present invention. A CFBG may be advantageous as it is in general easier to fabricate than a CSFBG. In practice, however, a zero-tilt angle may not always be optimal to ensure the best filter performance. The efficiency of coupling to cladding modes and thus the performance of a filter built with a CFBG will depend on the transversal structure of the optical fiber or the grating fabrication method.

In implementations using a CSFBG, the fringe tilt can be used to control the coupling to cladding modes. As seen in FIGS. 2 and 7, a fringe tilt increases the number of modes to which a core mode can be coupled efficiently. This favors a rapid attenuation of an incoming core mode by long period fringes before it reaches grating fringes with a period leading to its reflection within the core of the fiber. A fringe tilt thus favours a strong attenuation and a reduced reflection within the fiber core. Furthermore, as seen in FIGS. 2 and 7, a fringe tilt can also decrease the reflection at the Bragg wavelength. This means that in a CSFBG, a proper tilt angle can reduce the fraction of light that has not been lost to cladding modes that will actually get reflected in the fiber core. In some implementation of the disclosed filter, a CFBG may be viewed as the special case of a CSFBG with a zero-tilt angle that will in general provide sub-optimal performances. Whether an easier to fabricate CFBG can provide sufficient performances will depend on the application at hand.

Figure 11:
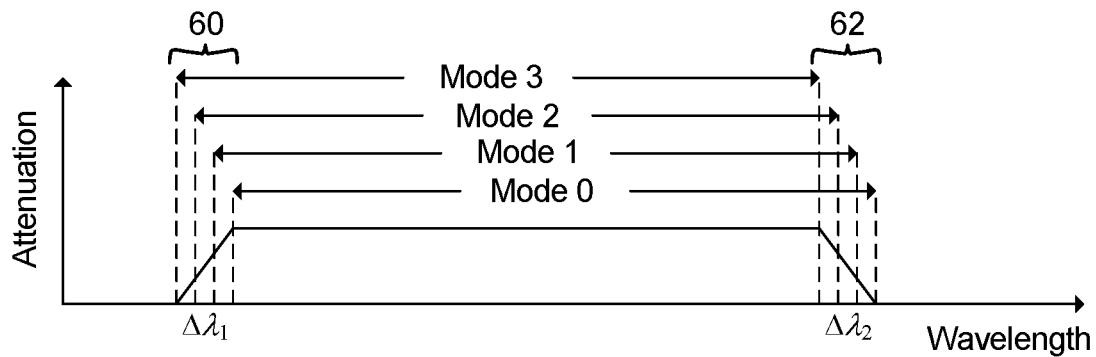
FIG. 11 schematically illustrates the expected shift to shorter wavelengths of the contribution of a higher order core mode to the spectral response of a CSFBG written in a multimode fiber.

In the preceding paragraphs, the operation of the filter has been explained assuming that the incoming light is carried only by the fundamental core mode of a single mode fiber. In some embodiments, the filter described herein may be used in a multimode fiber supporting more than one core mode. Higher order core modes have effective indexes smaller than the fundamental core mode. Phase matching of a higher order mode to a given cladding mode at a given grating period thus occurs at a shorter wavelength. Furthermore, the transversal profile of a higher order core mode differs from that of the fundamental core mode. Hence, the scattering efficiency from higher order core modes to a given cladding mode may also differ from the scattering efficiency of the fundamental core mode to the same cladding mode. Notwithstanding this, the contribution of a higher order core mode to the spectral response of a CSFBG written in a multimode fiber is expected to be generally shifted towards shorter wavelengths as shown in FIG. 11. A transition zone at short wavelengths 60 thus appears where only higher order core modes are filtered by the CSFBG. A CSFBG designed to attenuate all core modes carrying deleterious light and transmit unhindered all core modes carrying useful light located at a shorter wavelength than deleterious light can thus fully provide the desired attenuation of deleterious light only down to a wavelength slightly larger than the useful light wavelength. Likewise, a transition zone exists 62 at long wavelengths where only lower order core modes are filtered by the CSFBG. A CSFBG designed to attenuate all core modes carrying deleterious light and transmit unhindered all core modes carrying useful light located at a longer wavelength can thus fully provide the desired attenuation of deleterious light only up to a wavelength slightly shorter than the useful light wavelength. These transition zones of incomplete attenuation of deleterious light will be narrower in an optical fiber with a low numerical aperture, since the effective indexes of core modes are then closer to one another and the contributions to the spectral response of the various core modes will be more closely packed. Furthermore, similarly as in a single mode fiber, a large refractive index modulation and a very large number of cladding modes are helpful in ensuring that all core modes are coupled effectively to cladding modes. On the other hand, the large index modulation enhances the risk of having light reflected into the fiber core, hence the importance of entering the grating from the longer period side.

Figure 12A:
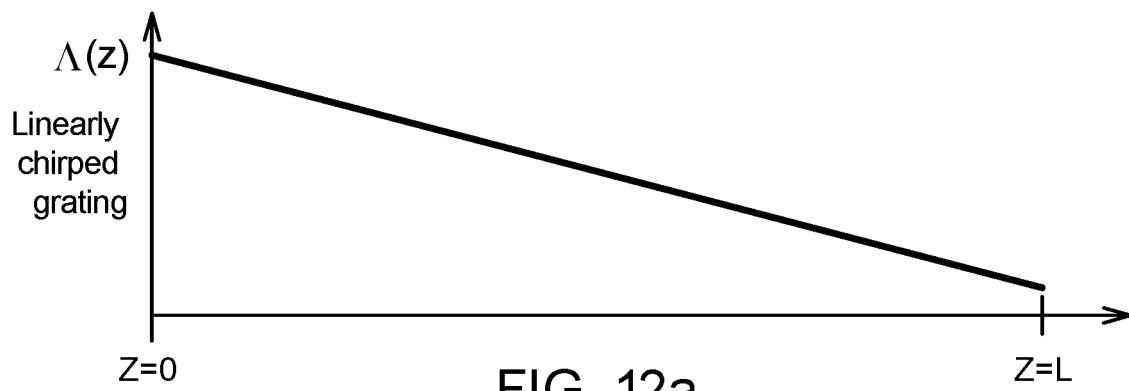
FIGS. 12a and 12b illustrate the variation of the period of optical filters respectively based on a linearly chirped and a nonlinearly chirped FBG.
Figure 12B:
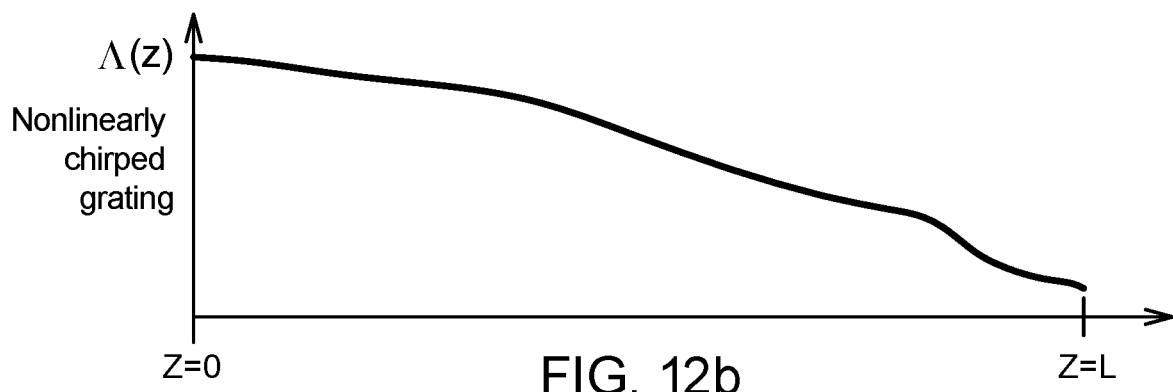

Referring to FIGS. 12a and 12b, in some embodiments the period of the filter 22 decreases monotonously from the input end 28 to the output end 32. In some variants, such as shown in FIG. 12a, the rate of change of the period of the filter may be constant along the length of the FBG, thereby defining a linearly chirped grating. In other variants, such as shown in FIG. 12b, the rate of change of the period of the filter may be variable along the length of the FBG, thereby defining a nonlinearly chirped grating. The range of periods, the tilt angle and the amplitude of the refractive index modulation are chosen to ensure efficient coupling of core modes to counter-propagating cladding modes over the spectral band covered by deleterious light, while avoiding such coupling at the wavelength of useful light. The design of the CSFBG can include a variation of the amplitude of the refractive index modulation (apodisation), of the chirp rate and of the tilt angle along the grating for added flexibility in tailoring the spectral response of the filter. Furthermore, as well known in the art (see e.g. J. Lauzon and F. Ouellette, Use of a temperature gradient to impose a chirp on a fibre Bragg grating, U.S. Pat. No. 5,671,307; and L. E. Adams et al., Method of making optical chirped grating with an intrinsically chirped grating and external gradient, U.S. Pat. No. 6,169,831), the spectral response of a chirped grating can be tuned by applying a temperature or strain gradient along the grating. Such a gradient can be applied to the CSFBG to tune the bandwidth and amplitude of its spectral response.

Figure 13A:
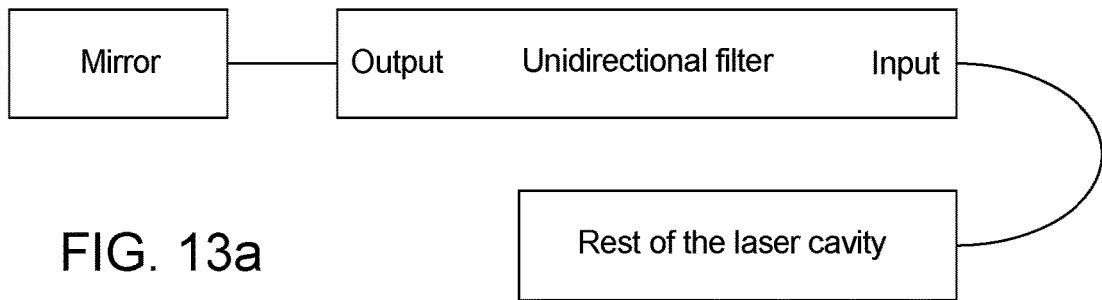
FIGS. 13a and 13b schematically illustrate the use of a filter with a fiber laser cavity according to two variants.
Figure 13B:
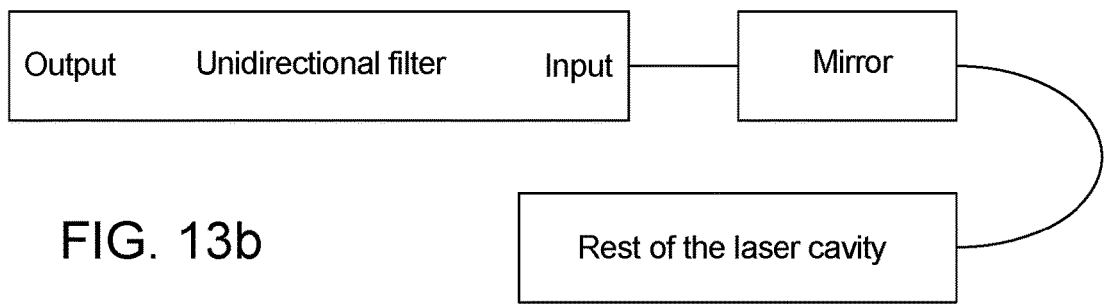

The embodiment of FIGS. 9a and 12 is meant as a unidirectional filter to be used with light incident from one side only, where the filter period is largest. An example of application would be the filtering of deleterious light inside a fiber laser cavity, as shown in FIGS. 13a and 13b, with the filter located at one end of the cavity in close proximity to a FBG used as a mirror reflecting useful light but not deleterious light. The end of the filter where the period is largest faces the cavity. The filter can be on either side of the FBG mirror, as contrasted in FIGS. 13a and 13b.

Figure 14:
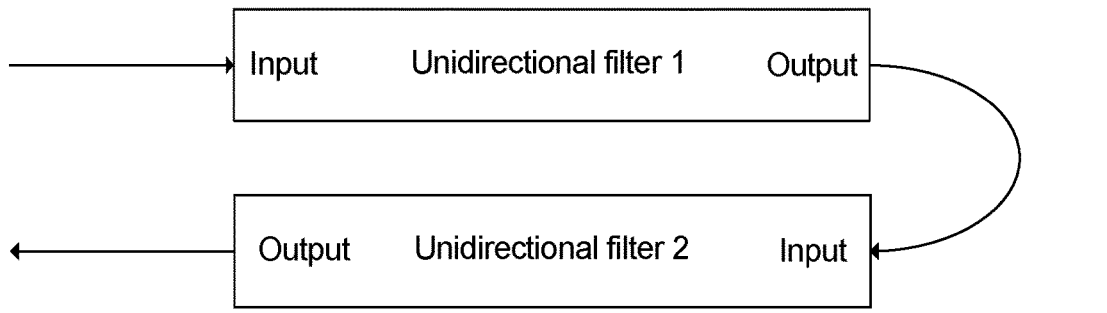
FIG. 14 schematically illustrates the use of a cascade of unidirectional filters with different periods according to one embodiment.

Referring to FIG. 14, in some implementations, the optical filter or FBG may be embodied by a cascade of unidirectional filters with different periods. Such a configuration can provide attenuation on different spectral bands, located for example on both sides of the wavelength of a useful light. For example, one filter provides attenuation at wavelengths shorter than the useful light wavelength and another one provides attenuation at longer wavelengths. The unidirectional filters have the same orientation with the ends where the period is maximum facing in the same direction. This cascade is preferably used as a unidirectional filter. The arrows indicate the appropriate direction of propagation of light through such a cascade. It will be readily understood that although only two filters are shown in the cascade illustrated in FIG. 14, a higher number of such filters each covering a dedicated portion of the spectrum may alternatively be provided.

As mentioned above, the tilt angle of the grating fringes can render the filter spectral response dependent on polarization, more so if the tilt angle is large. In another variant (not shown), to reduce this dependence on polarization, two unidirectional filters can be cascaded, with the second filter rotated by 90 degrees with regards to the first filter, the axis of rotation being the axis of the optical fiber. As a result, light polarized in the plane of incidence of the first filter fringes is polarized perpendicularly to the plane of incidence of the second filter fringes and vice versa. The input ends of both directional filters face in the same direction as in the previous embodiment (see FIG. 14) and this cascade should be used as a unidirectional filter.

Figure 15:
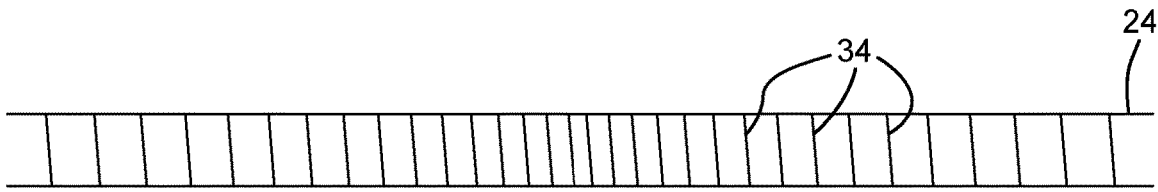
FIG. 15 is a schematized representation of a bidirectional filter where the period of the fringes is shortest at some point within the filter and increases towards both ends of the filter.
Figure 15A:
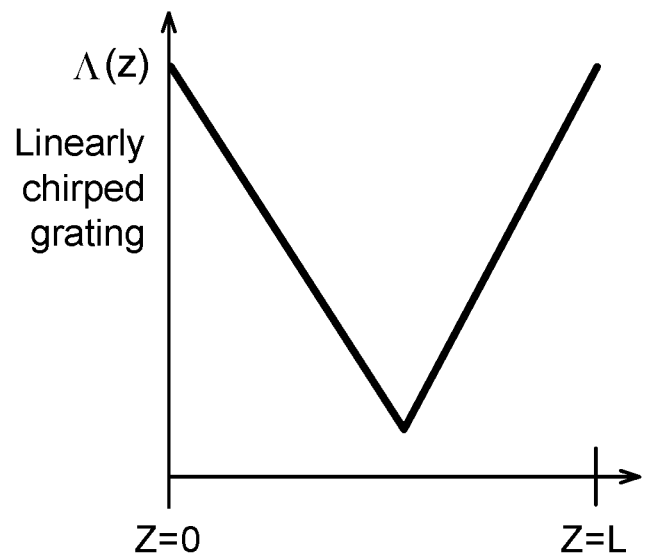
FIGS. 15a and 15b respectively show the grating period variation of such a filter based on linearly chirped and nonlinearly chirped segments.
Figure 15B:
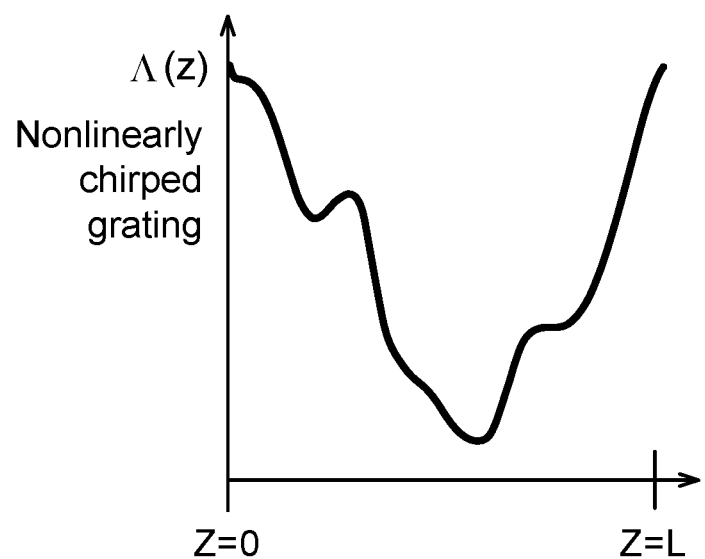

In another implementation, the filter may have a period variation which is not monotonous. Referring to FIG. 15, there is illustrated one example of a filter 20 where the period of the fringes 34 is shortest at some point within the filter and increases towards both ends of the filter. This variant may in essence correspond to the combination of two unidirectional filters such as described above disposed back to back along the fiber core 24 in opposite directions. This filter is bidirectional, ensuring a low reflectivity in the fiber core for light incident at either ends of the filter. It could be used, for example, inside a fiber laser cavity at a position where deleterious light is expected to be incident from both sides. The refractive index profile of either side of the filter 20 may be linearly chirped, such as shown in FIG. 15a, or nonlinearly chirped, such as shown in FIG. 15b. The period profile of this embodiment may be symmetrical or not. As in a unidirectional filter, apodisation and longitudinal variation of the chirp rate and tilt angle can be used for more flexibility in shaping the spectral response. Active tuning can be implemented as well by varying the temperature or strain along the filter. Cascades of bidirectional filters similar to those discussed above in the case of unidirectional filters can also be used to provide attenuation in different spectral bands or reduce the polarization dependence of the spectral response.

Figure 16:
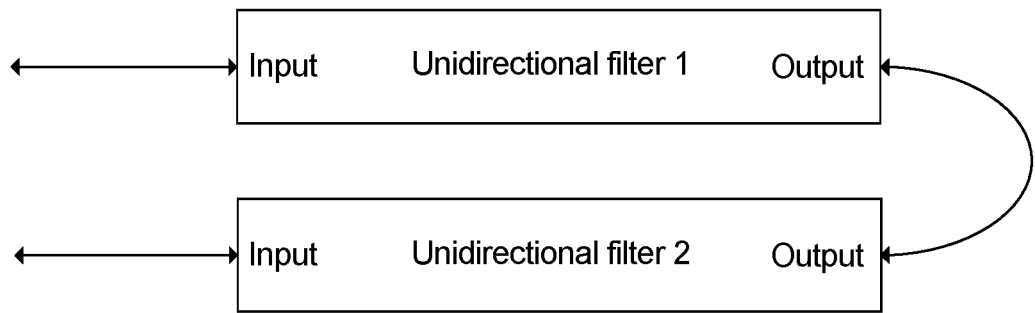
FIG. 16 is a schematized representation of a bidirectional filter using cascaded unidirectional filters.
Figure 16A:
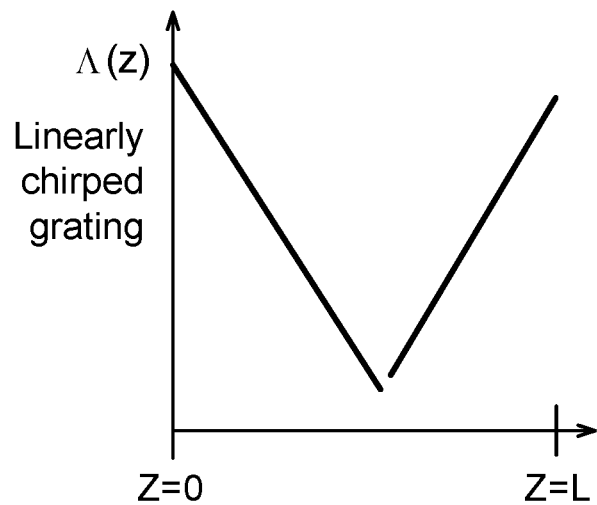
FIGS. 16a and 16b respectively show the grating period variation of such a filter based on linearly chirped and nonlinearly chirped unidirectional filters.
Figure 16B:
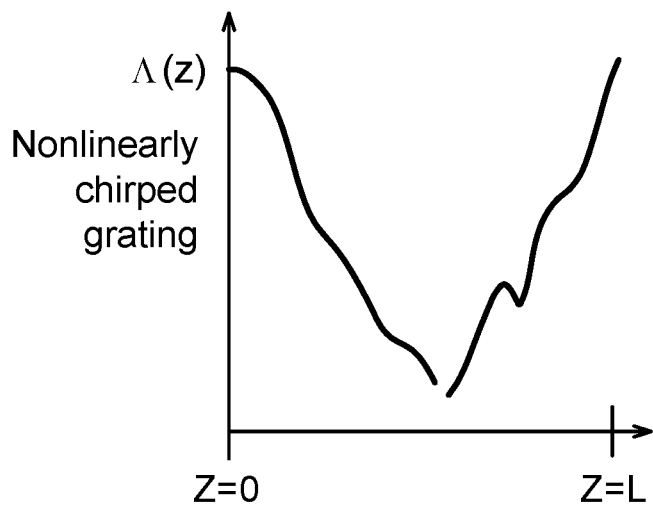
Figure 17:
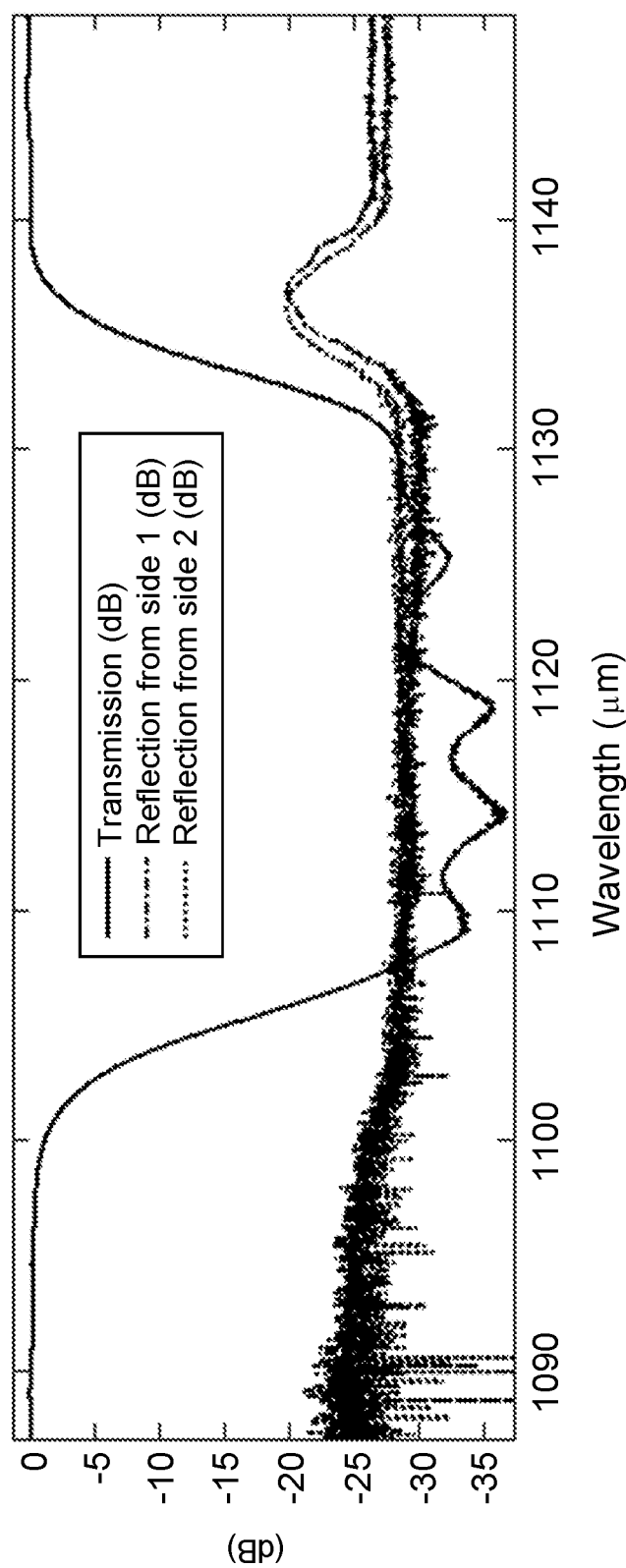
FIG. 17 is a graph of the measured spectral response of bidirectional filter.

In other implementations, a bidirectional filter can also be obtained by cascading two unidirectional filters with opposite orientations such that light incident on either side of the cascade encounters longer periods first (see FIG. 16). The cascade can for example be implemented by splicing together two fiber segments, each segment containing one unidirectional filter. The refractive index profile of each unidirectional filter of the cascade may be linearly chirped, such as shown in FIG. 16a, or nonlinearly chirped, such as shown in FIG. 16b. Both unidirectional filters may also be written at different positions along a common fiber segment. Such a cascade may thus be used with light propagating in both directions as shown by the arrows. The filters in this cascade may be similar or dissimilar. Active tuning may be applied to either one or both of the unidirectional filters. The distance between the filters is in principle arbitrary but in practice should preferably be short enough that no significant amount of deleterious light is generated in-between. Such bidirectional filters can be cascaded to provide filtering of different spectral bands or reduce the dependence to polarization. FIG. 17 presents the measured spectral response of a cascade of two unidirectional filters. The filter provides an attenuation of more than 28 dB over a bandwidth of 23 nm. The filter is clearly bidirectional, displaying a low reflectivity in both directions. The reflectivity within the attenuation band is actually smaller than that displayed in the graph, the −28 dB floor corresponding to the noise level of the measurement system in reflection. The reflectance of light entering from the red side increases on the long wavelength side of the attenuation band.

Figure 18A:
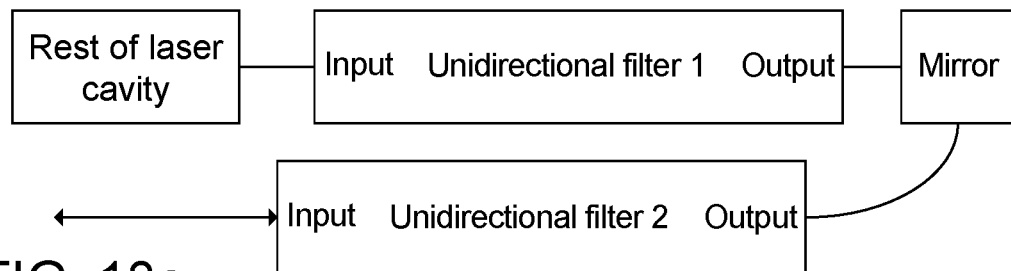
FIGS. 18a to 18c schematically represents various configurations making use of filters according to some embodiments.
Figure 18B:
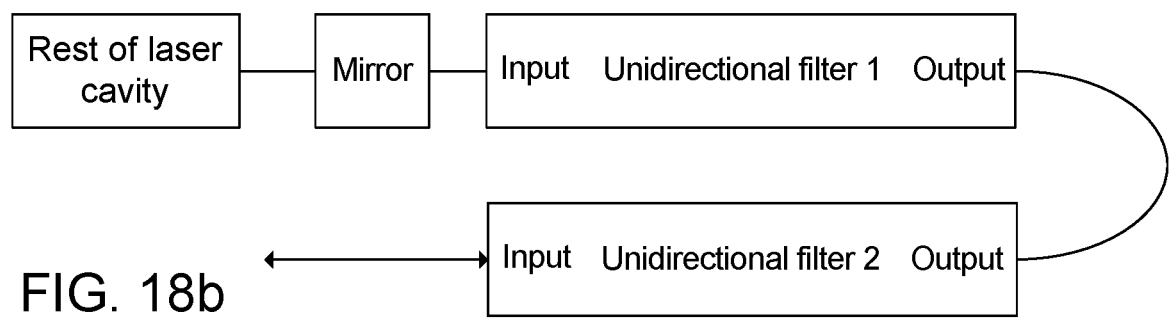
Figure 18C:
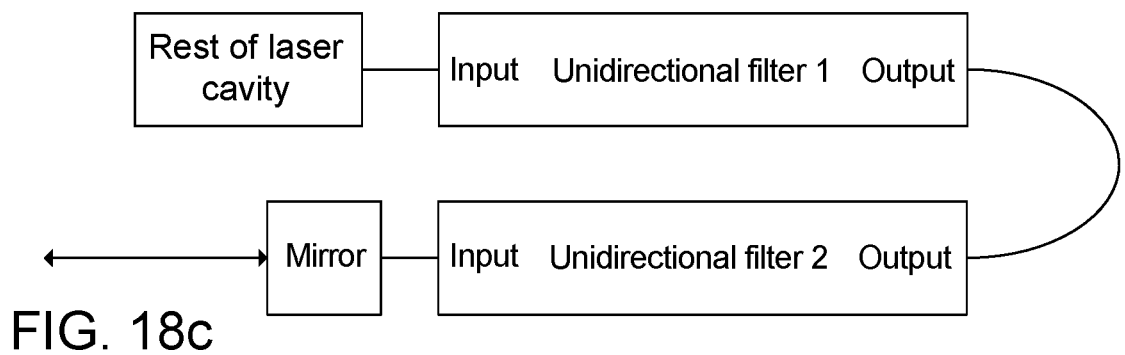

The CSFBGs forming the cascade described in the previous embodiment can be combined with other filters as well. For example, they can be combined with a FBG that partially reflects light at a useful wavelength. The resulting cascade of three filters can be used, for example, as the output coupler of a fiber laser wherein the useful wavelength corresponds to the desired wavelength of emission of the fiber laser. The FBG provides feedback at the laser wavelength and allows some coupling out of the laser. A first CSFBG with longer periods turned towards the laser cavity provides attenuation of deleterious light within the laser cavity while ensuring an ultra-low reflection of the deleterious light towards the laser cavity. A second CSFBG with longer periods facing away from the laser cavity provides attenuation of deleterious light propagating towards the laser cavity from the outside while ensuring an ultra-low reflection of the deleterious light away from the laser cavity. In such an arrangement, the FBG can be located between the CSFBGs or on either side of the pair of CSFBGs, as shown in FIG. 18.

Any of the previous embodiments can be collocated with a light stripper to evacuate the optical power diverted to cladding modes, in which case the filter is preferably mounted inside a package allowing heat dissipation.

Of course, numerous modifications could be made to the embodiments described above without departing from the scope of the invention.

The invention claimed is:

1. A bidirectional filter for filtering a light beam having a useful component and a deleterious component, the bidirectional filter comprising:
    a pair of Fiber Bragg gratings (FBG), each FBG comprising:
        an optical fiber path having a core and at least one cladding surrounding said core; and
        a refractive index modulation in the core of the optical fiber path and having a chirped period,
    wherein the FBGs of said pair are disposed in a cascade in opposite orientations with the period of the corresponding refractive index modulation decreasing progressively towards the other one of said FBGs, the refractive index modulation of each FBG being configured to allow propagation of the useful component of the light beam through the FBG in a core mode and to couple the deleterious component of the light beam into one or more counter propagating cladding mode of the optical fiber path.

2. The bidirectional filter according to claim 1, wherein the refractive index modulations in the FBGs of the pair have a same profile.

3. The bidirectional filter according to claim 1, wherein the refractive index modulations in the FBGs of the pair have a different profile.

4. The bidirectional filter according to claim 1, wherein the refractive index modulation of each FBG defines slanted grating fringes having a tilt angle.

5. The bidirectional filter according to claim 4, wherein the tilt angle of the grating fringes is between about 1.5 and 15 degrees.

6. The bidirectional filter according to claim 4, wherein the tilt angle of the grating fringes is between about 2.6 and 5.2 degrees.

7. The bidirectional filter according to claim 1, wherein the refractive index modulation of each FBG define grating fringes covering a portion only of the core.

8. The bidirectional filter according to claim 1, wherein the core of the optical fiber path of each FBG is multimode.

9. The bidirectional filter according to claim 1, wherein the period of the refractive index modulation of one or both FBGs is linearly chirped.

10. The bidirectional filter according to claim 1, wherein the period of the refractive index modulation of one or both FBGs is nonlinearly chirped.

11. The bidirectional filter according to claim 1, wherein the refractive index modulation of each FBG has an apodized amplitude.

12. The bidirectional filter according to claim 1, wherein the deleterious component is one of Amplified Spontaneous Emission and Raman scattering.

13. The bidirectional filter according to claim 1, further comprising an active tuning mechanism coupled to at least one of the FBGs.

14. The bidirectional filter according to claim 1, wherein one or both of said FBGs comprises a light stripper configured to evacuate the deleterious component from the one or more counter propagating cladding mode.

15. A bidirectional filter for filtering a light beam having a useful component and a deleterious component, comprising:
    an optical fiber path having a core and at least one cladding surrounding the core;
    a Fiber Bragg grating (FBG) having a refractive index modulation provided along the core of the optical fiber path and having a period varying along the FBG, the period being maximum at opposite ends of the FBG and decreasing progressively towards an intermediate point thereof, the refractive index modulation of the FBG being configured to allow propagation of the useful component of the light beam through the FBG in a core mode and to couple the deleterious component of the light beam into one or more counter propagating cladding mode of the optical fiber path.

16. The bidirectional filter according to claim 15, wherein the refractive index modulation of the FBG defines slanted grating fringes having a tilt angle.

17. The bidirectional filter according to claim 16, wherein the tilt angle of the grating fringes is between about 1.5 and 15 degrees.

18. The bidirectional filter according to claim 16, wherein the tilt angle of the grating fringes is between about 2.6 and 5.2 degrees.

19. The bidirectional filter according to claim 15, wherein the refractive index modulation of the FBG define grating fringes covering a portion only of the core.

20. The bidirectional filter according to claim 15, wherein the core of the optical fiber path is multimode.

21. The bidirectional filter according to claim 15, wherein the period of the refractive index modulation of the FBG is linearly chirped.

22. The bidirectional filter according to claim 15, wherein the period of the refractive index modulation of the FBG is nonlinearly chirped.

23. The bidirectional filter according to claim 15, wherein the refractive index modulation the FBG has an apodized amplitude.

24. The bidirectional filter according to claim 15, where the intermediate point of the FBG is a midpoint of said FBG.

25. The bidirectional filter according to claim 15, wherein the deleterious component is one of Amplified Spontaneous Emission and Raman scattering.

26. The bidirectional filter according to claim 15, further comprising an active tuning mechanism coupled to the FBG.

27. The bidirectional filter according to claim 15, wherein the FBG comprises a light stripper configured to evacuate the deleterious component from the one or more counter propagating cladding mode.

28. A bidirectional filter for filtering a light beam, comprising:
    a pair of Fiber Bragg gratings (FBG), each FBG defining a refractive index modulation having a chirped period, the FBGs of said pair being disposed in a cascade in opposite orientations with the period of the corresponding refractive index modulation decreasing progressively towards the other one of said FBGs.

29. The bidirectional filter according to claim 28, wherein the refractive index modulations in the FBGs of the pair have a same profile.

30. The bidirectional filter according to claim 28, wherein the refractive index modulations in the FBGs of the pair have a different profile.

31. The bidirectional filter according to claim 28, wherein the refractive index modulation of each FBG defines slanted grating fringes having a tilt angle.

32. The bidirectional filter according to claim 31, wherein the tilt angle of the grating fringes is between about 1.5 and 15 degrees.

33. The bidirectional filter according to claim 31, wherein the tilt angle of the grating fringes is between about 2.6 and 5.2 degrees.

34. The bidirectional filter according to claim 28, wherein the refractive index modulation of each FBG define grating fringes covering a portion only of a core of a corresponding optical fiber path.

35. The bidirectional filter according to claim 28, wherein the core of the optical fiber path of each FBG is multimode.

36. The bidirectional filter according to claim 28, wherein the period of the refractive index modulation of one or both FBGs is linearly chirped.

37. The bidirectional filter according to claim 28, wherein the period of the refractive index modulation of one or both FBGs is nonlinearly chirped.

38. The bidirectional filter according to claim 28, wherein the refractive index modulation of each FBG has an apodized amplitude.

39. The bidirectional filter according to claim 28, further including an active tuning mechanism coupled to at least one of the FBGs.

40. A bidirectional filter for filtering a light, comprising:
a Fiber Bragg grating (FBG) having a refractive index modulation having a period varying along the FBG, the period being maximum at opposite ends of the FBG and decreasing progressively towards an intermediate point thereof.

41. The bidirectional filter according to claim 40, wherein the refractive index modulation of the FBG defines slanted grating fringes having a tilt angle.

42. The bidirectional filter according to claim 41, wherein the tilt angle of the grating fringes is between about 1.5 and 15 degrees.

43. The bidirectional filter according to claim 41, wherein the tilt angle of the grating fringes is between about 2.6 and 5.2 degrees.

44. The bidirectional filter according to claim 40, wherein the refractive index modulation of the FBG define grating fringes covering a portion only of a core of a corresponding optical fiber path.

45. The bidirectional filter according to claim 40, wherein the period of the refractive index modulation of the FBG is linearly chirped.

46. The bidirectional filter according to claim 40, wherein the period of the refractive index modulation of the FBG is nonlinearly chirped.

47. The bidirectional filter according to claim 40, wherein the refractive index modulation the FBG has an apodized amplitude.

48. The bidirectional filter according to claim 40, where the intermediate point of the FBG is a midpoint of said FBG.

49. The bidirectional filter according to claim 40, further comprising an active tuning mechanism coupled to the FBG.

* * * * *